(12) United States Patent
Nakae

(10) Patent No.: US 8,296,821 B2
(45) Date of Patent: Oct. 23, 2012

(54) SYSTEM, SERVER, AND PROGRAM FOR ACCESS RIGHT MANAGEMENT

(75) Inventor: Masayuki Nakae, Tokyo (JP)

(73) Assignee: NEC Corporation, Tokyo (JP)

( * ) Notice: Subject to any disclaimer, the term of this patent is extended or adjusted under 35 U.S.C. 154(b) by 1004 days.

(21) Appl. No.: 12/068,673

(22) Filed: Feb. 8, 2008

(65) Prior Publication Data

US 2008/0222694 A1 Sep. 11, 2008

(30) Foreign Application Priority Data

Mar. 9, 2007 (JP) ................................ 2007-060581

(51) Int. Cl.
*H04L 29/06* (2006.01)
(52) U.S. Cl. ................................ 726/1; 726/26; 726/27
(58) Field of Classification Search ................ 726/1, 26, 726/27
See application file for complete search history.

(56) References Cited

U.S. PATENT DOCUMENTS

| | | | |
|---|---|---|---|
| 6,601,083 B1 * | 7/2003 | Reznak | 718/104 |
| 6,708,209 B1 * | 3/2004 | Ebata et al. | 709/223 |
| 6,789,204 B2 * | 9/2004 | Abdelnur et al. | 726/1 |
| 7,382,879 B1 * | 6/2008 | Miller | 380/201 |
| 7,420,941 B2 * | 9/2008 | Moon et al. | 370/328 |
| 7,624,424 B2 * | 11/2009 | Morita et al. | 726/1 |
| 7,669,225 B2 * | 2/2010 | Peled et al. | 726/1 |
| 7,801,976 B2 * | 9/2010 | Hodges et al. | 709/223 |
| 7,840,229 B2 * | 11/2010 | Luo | 455/518 |
| 2006/0248206 A1 | 11/2006 | Moerdijk et al. | |
| 2008/0127310 A1 * | 5/2008 | Robbins et al. | 726/4 |

FOREIGN PATENT DOCUMENTS

| | | |
|---|---|---|
| JP | 2006-506696 A | 2/2006 |
| JP | 2006-092073 | 4/2006 |

OTHER PUBLICATIONS

Fillia Makedon, Calliope Sudborough, Beth Baiter, Grammati Pantziou and Marialena Conalis—Kontos, 2003. "A Safe Information Sharing Framework for E-Government Communication", IT white paper from Boston university.*
M. Nakae et al., "A method for access policy negotiation towards secure information sharing crossing over organizations," Information and Communication System Security, The Institute of Electronics, Information and Communication Engineers, Feb. 27-28, 2007' pp. 43-48.
S. J. Greenwald, "A New Security Policy for Distributed Resource Management and Access Control," Proceedings of the 1996 workshop on New Security Paradigms, 1996, pp. 74-86.
S. di Vimercati et al., "Access Control in Federated Systems," Proceedings of the 1996 workshop on New Security Paradigms, 1996, pp. 87-99.

* cited by examiner

*Primary Examiner* — Beemnet Dada
*Assistant Examiner* — Randal Moran
(74) *Attorney, Agent, or Firm* — Foley & Lardner LLP

(57) ABSTRACT

Each domain is provided with an access right management device which creates a resource-sharing policy and performs processing for resource-sharing policy negotiation between a plurality of domain administrators. An access right management device that has created a resource-sharing policy identifies, for each policy unit included in the resource-sharing policy, an access right management device that is a negotiating partner to negotiate with about the policy unit in question. The access right management device generates negotiation information including an identification name of the identified negotiating-partner access right management device and the policy unit in question and sends the negotiation information to the negotiating-partner access right management device. Only when all policy units are agreed on by respective identified negotiating-partner access right management devices, the resource-sharing policy is set on shared resources.

25 Claims, 21 Drawing Sheets

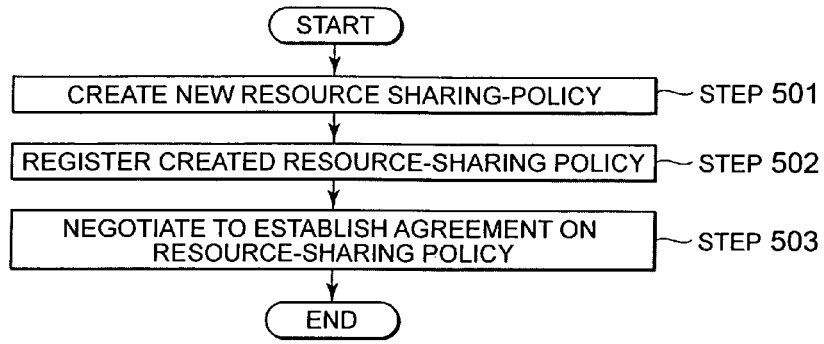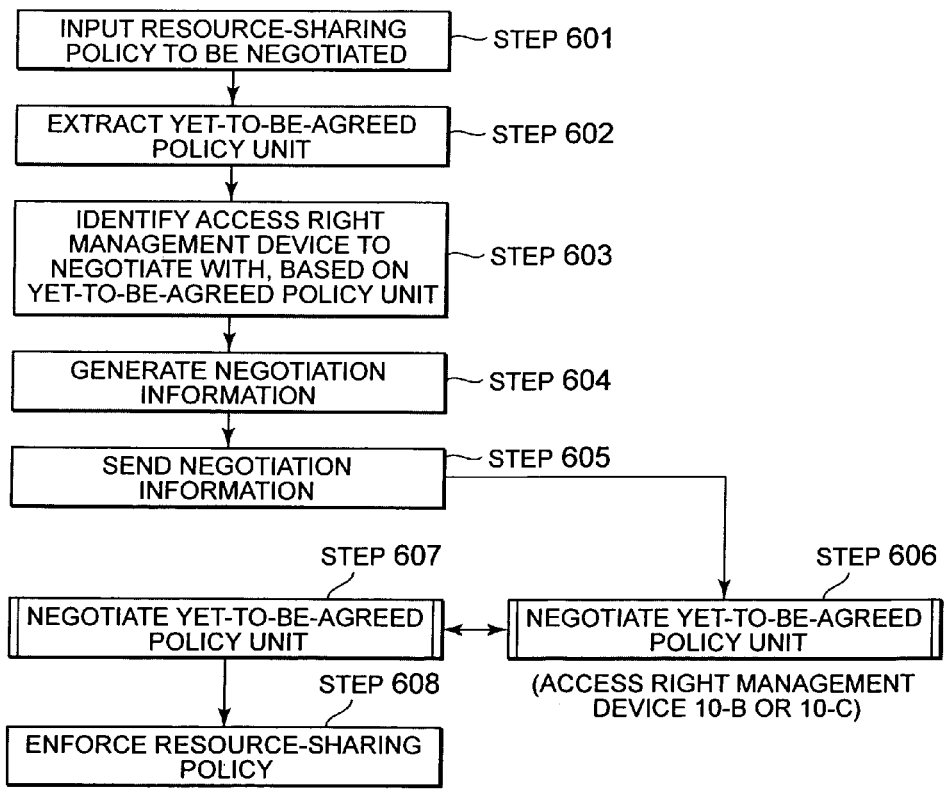

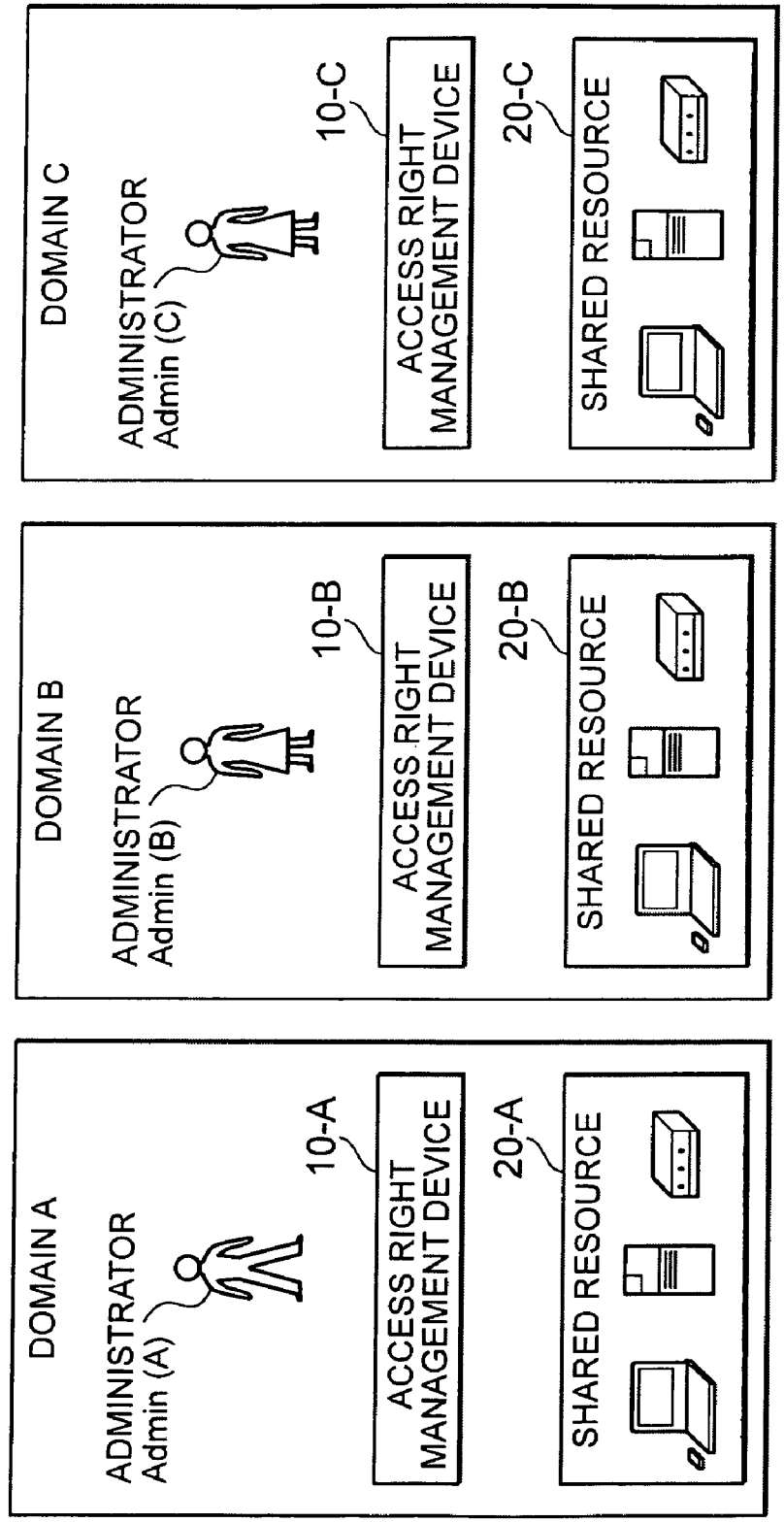

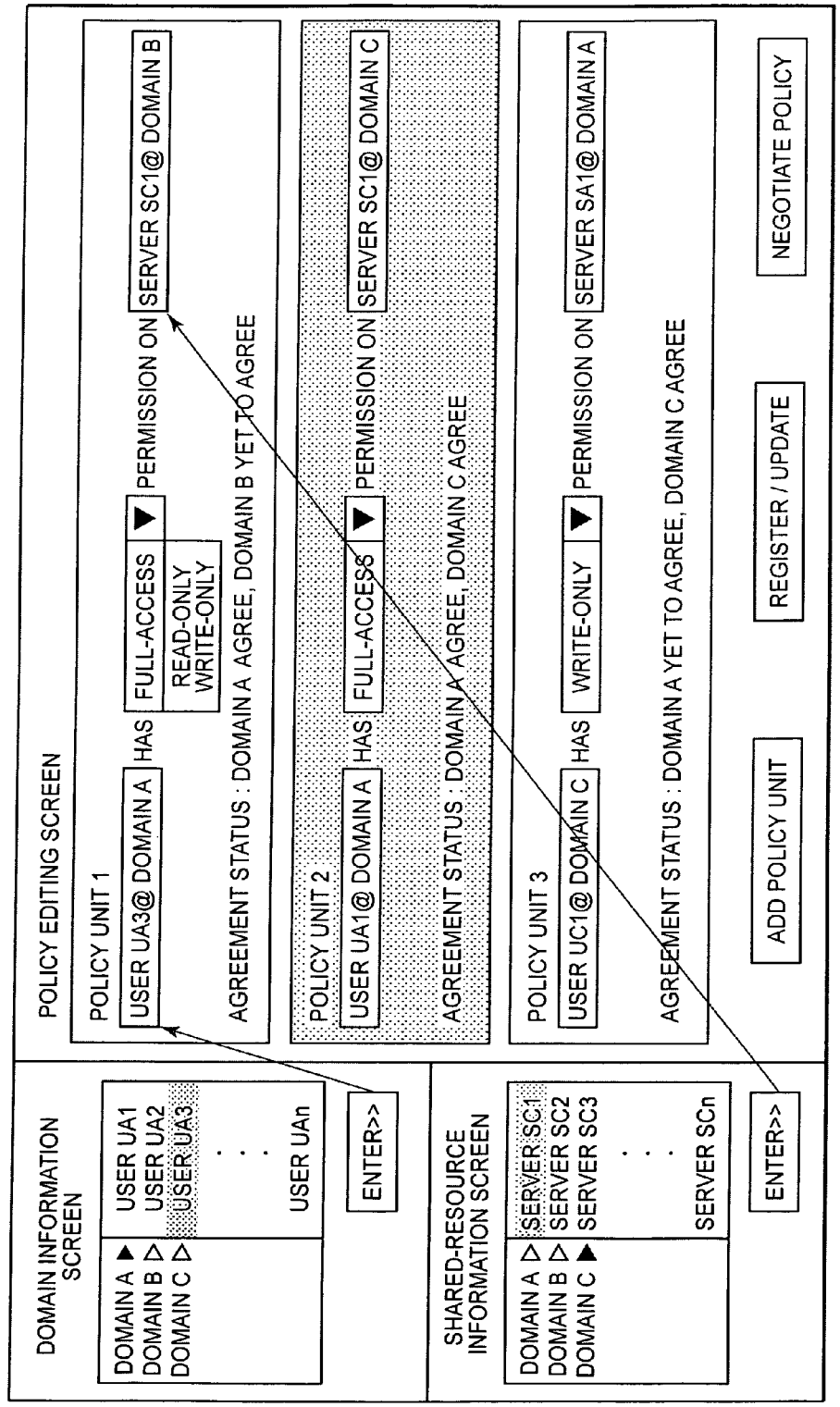

FIG. 9

```
<policy>
<!--IDENTIFICATION NAME OF ACCESS RIGHT MANAGEMENT DEVICE 10-A BY WHICH POLICY IS CREATED-->
<created_at>policy-server@domainA.com</created_at>

<!--POLICY VERSION NO.-->
<revision>1</revision>

<rules><!--POLICY UNITS ARE ENUMERATED BELOW-->
<!--POLICY UNIT#1-->
<rule>
  <subjects>
    <subject>UA3@domainA</subject>
  </subjects>
  <objects>
    <object>SC1@domainC</object>
  </objects>
  <actions>
    <abyaction/>
  </actions>
</rule>
<!--POLICY UNIT#2-->
<rule>
 ......
</rules>
</policy>
```

FIG. 11

```xml
<negotiation-information>
<!--LIST OF IDENTIFICATION NAMES OF ACCESS RIGHT MANAGEMENT DEVICES REQUIRING NEGOTIATION-->
<policy-servers>
    <policy-server>
        policy-server@domainA.com
    </policy-server>
    <policy-server>
        policy-server@domainB.com
    </policy-server>
</policy-servers>

<!--YET-TO-BE-AGREED POLICY UNIT-->
<rule>
    <subjects>
        <subject>UA1@domainA</subject>
    </subjects>
    <objects>
        <object>SB1@domainB</object>
    </objects>
    <actions>
        <any-action/>
    </actions>
</rule>
</negotiation-information>
```

FIG. 14

```
<negotiation-information>
<!--LIST OF IDENTIFICATION NAMES OF ACCESS RIGHT MANAGEMENT DEVICES REQUIRING NEGOTIATION-->
<policy-servers>
  <policy-server>
    policy-server@domainA.com
  </policy-server>
  <policy-server>
    policy-server@domainB.com
  </policy-server>
</policy-servers>

<!--Asmin (B) YET-TO-BE-AGREED POLICY UNIT WITH Admin (B) SIGNATURE AFFIXED THERETO-->
<Signature>
  <SignedInfo>
    <Reference URI="proposal from domain A" />
  </SignedInfo>
  <SignatureValue> Ak j83V jkfd8das···</SignatureValue>
  <Keyinfo>
    <KeyValue> lfdk jsal : euh=ne7vz···</KeyValue>
    <X509Data> cn=Admin (B) , o=domainB</><509Data>
  </Keyinfo>

<SignedObject id="proposal from domain A">
    <rule_id="proposal from domain A">
      <subjects>
        <subject>UA1@domainA</subject>
      </subjects>
      <objects>
        <object>SB1@domainB</object>
      </objects>
      <actions>
        <any-action/>
      </actions>
    </rule>
  </SignedObject>
</Signature>
</negotiation-information>
```

SYSTEM, SERVER, AND PROGRAM FOR ACCESS RIGHT MANAGEMENT

BACKGROUND OF THE INVENTION

1. Field of the Invention

This application is based upon and claims the benefit of priority from Japanese Patent Application No. 2007-060581, filed on Mar. 9, 2007, and "A method for access policy negotiation towards secure information sharing crossing over organizations" (Information and Communication System Security, The INSTITUTE OF ELECTRONICS, INFORMATION AND COMMUNICATION ENGINEERS, Feb. 27 and 28, 2007), the disclosure of which is incorporated herein in its entirety by reference.

The present invention relates to a system, a method, and a program for access right management and, more particularly, to a system, a method, and a program for access right management to establish an agreement efficiently and certainly when a plurality of administrators are present.

2. Description of the Related Art

Most of conventional access right management systems handle users' access to resources such as computers and network equipment in a single organization, as can be seen in the operation of a corporate business-related application, an intracorporate LAN, or the like. In recent years, as more corporate alliances and industry-academy joint researches have been made, there has been increasing interest in sharing resources such as an application server and a storage server across a plurality of organizations, and there have been proposed access right management systems for managing access to such shared resources.

An example of such an access right management system is described in Japanese Patent Application Unexamined Publication No. 2006-92073. When a policy regarding a workflow is formulated, this access right management system assists those who are in charge of the tasks that are the constituent elements of the workflow, in arbitrating the order in which the tasks are executed.

Specifically, when a person in charge of a certain task (workflow source) determines a subsequent task (workflow destination), if there are a plurality of candidates for the workflow destination, then the access right management system creates a place of communication, such as a mailing list, between the person in charge of the workflow source and those in charge of the workflow destination candidates, thereby assisting the person in charge of the workflow source in determining the most suitable workflow destination (suitable to the person in charge of the workflow source). In the place of communication, for example, the number of process steps taken before the task (workflow destination) is complete, price, and the like are negotiated, and one task is determined as the workflow destination according to the judgment of the person in charge of the workflow source.

Another example of the access right management system is described in Japanese Patent Application Unexamined Publication No. 2006-506696, which illustrates a method for concluding a service use policy (federated service agreement) between a service-providing device (donor framework) and a service-using device (receiver framework) in a situation where services are used across network domains. Here, the service use policy means data specifically indicating which service the service-using device is authorized to use among a plurality of services provided by the service-providing device.

According to the access right management method described in Japanese Patent Application Unexamined Publication No. 2006-506696, when the service-using device sends the ID of a service it desires to use to the service-providing device, the service-providing device responds to the service-using device with data (service token) indicating the conditions for using the service, such as a service level. Next, if the service-using device determines that the conditions described in the service token are met, the service-using device affixes its digital signature, indicative of an agreement, to the service token and sends the service token back to the service-providing device. Thereafter, the service-providing device also affixes its digital signature to the service token and responds to the service-using device. In this manner, the service token to which the digital signatures of both of the service-providing device and the service-using device are affixed are thereafter used as a service use policy formulated under the agreement of both devices.

Moreover, Greenwald, "A new security policy for distributed resource management and access control," Proceedings of the 1996 workshop on New Security Paradigms, 1996, pp. 74-86, and Vimercati and Samarati, "Access Control in Federated Systems," Proceedings of the 1996 workshop on New Security Paradigms, 1996, pp. 87-99 disclose methods for formulating and enforcing a policy (access policy) regarding access to a shared service resource such as a database when two or more different organizations (domains) share the service resource. According to any of the methods, an administrator of a certain domain is selected as a representative of a group of domains desiring to use a predetermined shared resource, to centrally formulate an access policy.

In general, an access policy is defined as a list of access policy units, each of which is composed of a set of an access subject, an access object, and an access action. When a plurality of domains share a service resource, as in the policy formulation methods disclosed in Greenwald and in Vimercati and Samarati as examples, a specific domain administrator or third party is entrusted with access right management, as to the formulation of an access policy regarding the shared service resource. Such a scheme, therefore, has a problem of allowing the appointed domain administrator to unfairly formulate a policy that is essentially not accepted by other domain administrators.

Accordingly, administrators of domains that are the subjects to share the resource need to negotiate an access policy and reach an agreement. However, when negotiating and agreeing on an access policy, at least the following work needs to be done.

(1) A domain administrator creates a draft access policy and proposes it to other domain administrators.

(2) In the proposed draft access policy, each of the other domain administrators identifies an access policy unit requiring an approval of the domain administrator him/herself, and conducts verification of the identified access policy unit.

(3) Each of the other domain administrators further makes a reaction to the identified access policy unit, such as approving, rejecting, or making a counterproposal, and presents it to the other domain administrators as in (1).

(4) When every access policy unit is approved by all the domain administrators who are required, the access policy in question is kept by every domain administrator as an agreed access policy.

However, the use of any of the above-described conventional access right management methods cannot guarantee that the work of these four steps is performed efficiently and certainly in terms of system, because of the following problems.

A first problem is that the efficiency in the negotiation on an access policy between domain administrators is insufficient.

The reason is as follows. According to the access right management method described in Japanese Patent Application Unexamined Publication No. 2006-92073, the efficiency in negotiation is increased by creating the place of communication where the above-described steps (1) and (3) are performed, but the work of the step (2) is not included. If an access policy including a large number of access policy units is negotiated, there are a large number of irrelevant access policy units, which leads to decreased efficiency in verification.

A second problem is that the presentation of a counterproposal and an alteration after an agreement is established are not considered.

The reason is as follows. The access right management method described in Japanese Patent Application Unexamined Publication No. 2006-506696 is an example of the implementation of the above-described steps (1), (3), and (4), but a method for presenting a counterproposal in the step (3) is not mentioned. In addition, when a domain administrator desires to alter part of the access policy after the step (4), the step (4) needs to be performed again. However, since this access right management method in question does not consider partial alteration, the negotiation according to the step (4), including negotiation on not-to-be-altered part, needs to be performed again.

SUMMARY OF THE INVENTION

An exemplary object of the present invention is to provide a system, a server, and a program for access right management that, when a service resource is shared between a plurality of domains, can assist domain administrators in efficiently and certainly establishing an agreement, at the formulation of an access policy regarding the shared service resource under the agreement between the domain administrators.

According to the present invention, a system includes an access right management device, which is provided in each domain, for creating a resource-sharing policy and performing resource-sharing policy negotiation between a plurality of domain administrators. The access right management device performs: for each policy unit of the resource-sharing policy, identifying an access right management device which is a negotiating partner about each policy unit; generating negotiation information including an identification name of the identified access right management device and the policy unit to be negotiated; and transmitting the negotiation information to the identified access right management device; and setting the resource-sharing policy on shared resource when having received an instruction to agree on every policy unit from the identified access right management device to which the negotiation information was sent.

According to the present invention, the following effect can be achieved. Since the configuration is made such that an access right management device of a domain with which negotiation is required is identified for each policy unit in a resource-sharing policy newly created and negotiation information is generated, it is possible to accomplish efficient policy negotiation, involving a minimum number of negotiating partners and using a minimum amount of policy description.

BRIEF DESCRIPTION OF THE DRAWINGS

FIG. 5 is a flow chart showing the overall operation of the access right management system according to the first exemplary embodiment of the present invention.

FIG. 6 is a flow chart to describe the contents of negotiation processing performed in the access right management system according to the first exemplary embodiment of the present invention.

FIG. 7 is a diagram showing an example of the relationships among a domain, an administrator, an access right management device, and a shared resource in the first exemplary embodiment of the present invention.

FIG. 8 is a diagram showing an example of a screen displayed by the policy editing section in the first exemplary embodiment of the present invention.

FIG. 9 is a diagram showing an example of a format of a resource-sharing policy.

FIG. 11 is an example of a format of negotiation information.

FIG. 14 is a diagram showing an example of negotiation information including a signed policy unit.

DETAILED DESCRIPTION OF THE PREFERRED EMBODIMENTS

Next, exemplary embodiments of the present invention will be described in detail with reference to the accompanying drawings.

First Exemplary Embodiment

Figure 1:
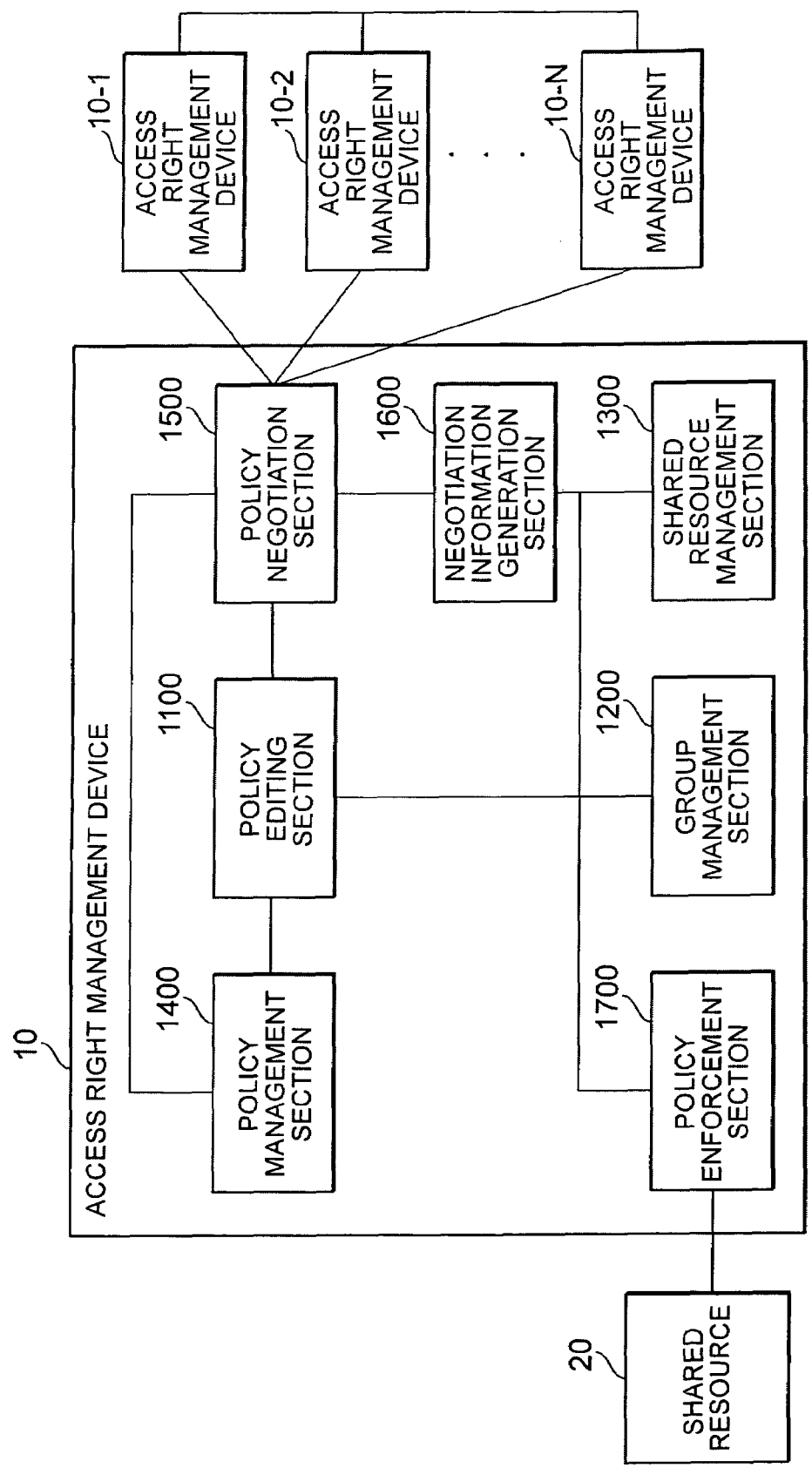
FIG. 1 is a block diagram showing a configuration of an access right management system according to a first exemplary embodiment of the present invention.

Referring to FIG. 1, in a first exemplary embodiment of the present invention, each organization has an access right management device 10 and shared resources 20 such as a computer, storage, etc. The access right management device 10 is connected to the access right management devices 10-1 to 10-N of other organizations.

The access right management device 10 and the access right management devices 10-1 to 10-N of the other organizations have identical configurations, and therefore the configuration of the access right management device 10 only will be described hereinafter.

The access right management device 10 includes: a policy editing section 1100; a group management section 1200; a shared resource management section 1300; a policy management section 1400; a policy negotiation section 1500; a negotiation information generation section 1600; and a policy enforcement section 1700.

Figure 2:
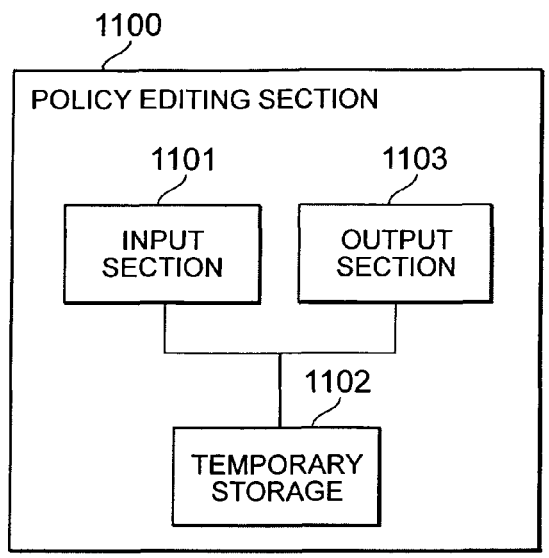
FIG. 2 is a block diagram showing a configuration of a policy editing section in the access right management system according to the first exemplary embodiment of the present invention.

Referring to FIG. 2, the policy editing section 1100 includes: an input section 1101, such as a keyboard and mouse, for accepting an operation made by an administrator to edit a resource-sharing policy; a temporary storage 1102 for temporarily storing a policy that is being edited and other necessary work data; and an output section 1103, such as a liquid crystal display (LCD), for displaying a policy stored in the temporary storage 1102.

When a new instruction to edit a policy is obtained through the input section 1101, the policy editing section 1100 extracts a resource-sharing policy corresponding to the instruction from the policy management section 1400 and stores the resource-sharing policy in the temporary storage 1102. At the same time, the policy editing section 1100 presents the resource-sharing policy in question to an administrator through the output section 1103.

Moreover, when a request to create a new policy or policy unit is entered through the input section 1101, the policy editing section 1100 extracts domain information, which includes identification names of the users in those domains involved in resource sharing, from the group management section 1200, extracts resource information, which is about resources shared in the group, from the shared resource management section 1300, and stores the domain information and the resource information in the temporary storage 1102. Thereafter, the policy editing section 1100 presents the domain information and the resource information to the administrator through the output section 1103.

Then, upon receipt of an input of a new or an updated policy unit through the input section 1101, the policy editing section 1100 adds the input policy unit to the resource-sharing policy stored in the temporary storage 1102, or updates the resource-sharing policy stored in the temporary storage 1102 with the input policy unit.

Further, when an instruction to negotiate a policy is obtained through the input section 1101, the policy editing section 1100 inputs the resource-sharing policy stored in the temporary storage 1102 into the policy negotiation section 1500 and, with a new resource-sharing policy output by the policy negotiation section 1500, replaces the old resource-sharing policy in the temporary storage 1102.

Alternatively, when an instruction to register a policy is obtained through the input section 1101, the policy editing section 1100 inputs the resource-sharing policy stored in the temporary storage 1102 into the policy management section 1400, thereby registering the resource-sharing policy.

Furthermore, when an instruction to enforce a policy is entered through the input section 1101, the policy editing section 1100 inputs the resource-sharing policy stored in the temporary storage 1102 into the policy enforcement section 1700, which then forcefully sets the resource-sharing policy on the shared resources 20 belonging to its own organization.

The group management section 1200 stores the domain information on each organization constituting a group by using a secondary storage device such as a hard disk drive (HDD) and, in response to an inquiry from the policy editing section 1100 and the negotiation information generation section 1600, extracts and outputs the stored domain information.

The shared resource management section 1300 stores the resource information regarding the resources such as a computer and a storage shared in the group in association with domains by using a secondary storage device such as a hard disk drive (HDD) and, in response to an inquiry from the policy editing section 1100 and the negotiation information generation section 1600, extracts and outputs the stored resource information.

The policy management section 1400 stores a resource-sharing policy of the group, which is input from the policy editing section 1100, by using a secondary storage device such as a hard disk drive (HDD), and also outputs the stored resource-sharing policy in response to an inquiry from the policy editing section 1100.

Figure 3:
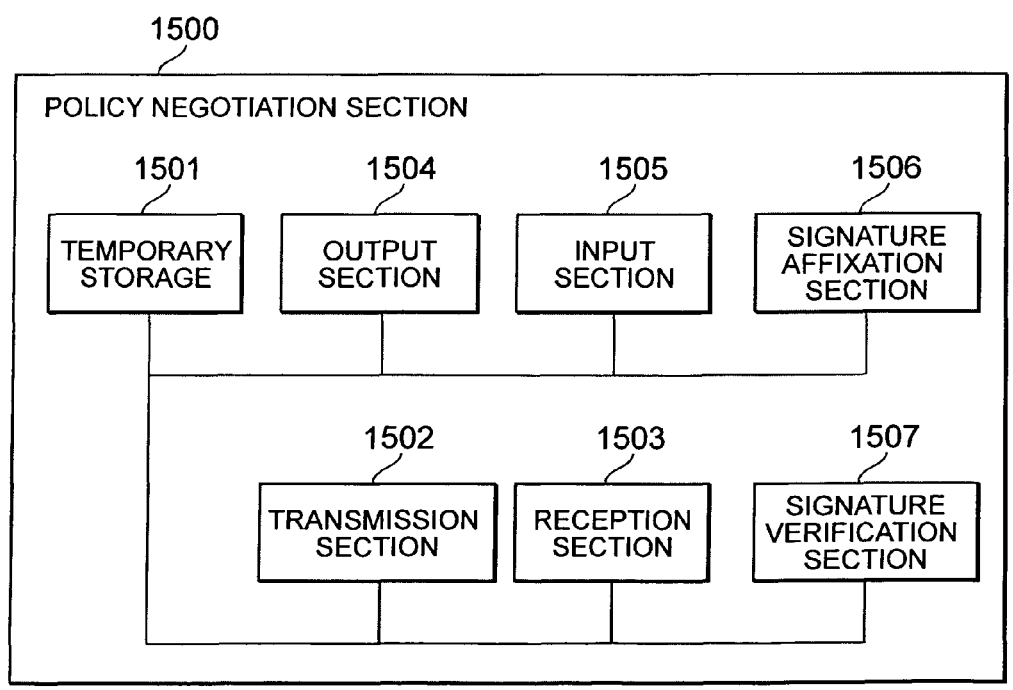
FIG. 3 is a block diagram showing a configuration of a policy negotiation section in the access right management system according to the first exemplary embodiment of the present invention.

Referring to FIG. 3, the policy negotiation section 1500 includes: a temporary storage 1501 for temporarily storing work data; a transmission section 1502; a reception section 1503; an output section 1504 such as a LCD; an input section 1505; a signature affixation section 1506; and a signature verification section 1507.

The policy negotiation section 1500 inputs a resource-sharing policy input from the policy editing section 1100 into the negotiation information generation section 1600 to obtain negotiation information, and stores the obtained negotiation information in the temporary storage 1501. Thereafter, while referring to the negotiation information in the temporary storage 1501, the transmission section 1502 sends one or more policy units to be negotiated to each appropriate one (negotiating partner) among the access right management devices 10-1 to 10-N.

The reception section 1503 receives one or more policy units sent from any one of the other access right management devices 10-1 to 10-N and stores the received polity unit in the temporary storage 1501.

The output section 1504 displays the received policy unit stored in the temporary storage 1501 to the administrator.

The input section 1505 accepts an instruction to agree on the policy unit from the administrator.

The signature affixation section 1506, in response to the instruction to agree obtained through the input section 1505, affixes a digital signature to the policy unit to be agreed on and stores the digital-signed policy unit in the temporary storage 1501.

The signature verification section 1507 refers to the policy unit in the temporary storage 1501, checks for a digital signature, and thereby determines whether or not the policy unit has been agreed on.

Figure 4A:
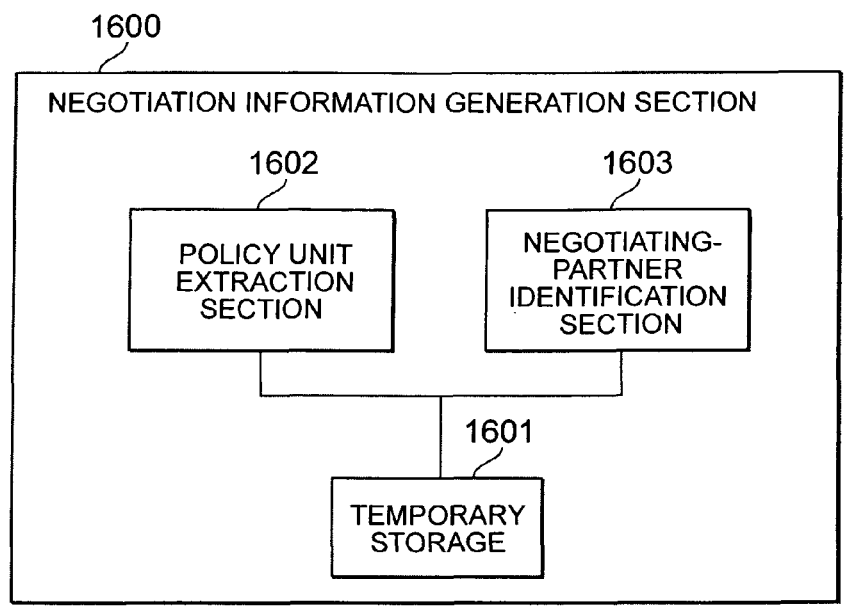
FIG. 4A is a block diagram showing a configuration of a negotiation information generation section in the access right management system according to the first exemplary embodiment of the present invention.

Referring to FIG. 4A, the negotiation information generation section 1600 includes: a temporary storage 1601 for temporarily storing work data; a policy unit extraction section 1602; and a negotiating-partner identification section 1603.

The negotiation information generation section 1600 stores a resource-sharing policy input from the policy negotiation section 1500 in the temporary storage 1601. Thereafter, the policy unit extraction section 1602 refers to the resource-sharing policy stored in the temporary storage 1601, extracts a policy unit (yet-to-be-agreed policy unit) on which an agreement has not been established, and stores the extracted yet-to-be-agreed policy in the temporary storage 1601.

The negotiating-partner identification section 1603, while referring to the yet-to-be-agreed policy unit stored in the temporary storage 1601, acquires related domain information and resource information from the group management section 1200 and the shared resource management section 1300 respectively and stores in the temporary storage 1601 an identification name (DNS name, IP address, or the like) of an access right management device with an administrator of which negotiation is required.

Thereafter, the negotiation information generation section 1600 generates negotiation information including the identification name of the access right management device and related yet-to-be-agreed policy unit, which are stored in the temporary storage 1601, and outputs the negotiation information to the policy negotiation section 1500.

Figure 4B:
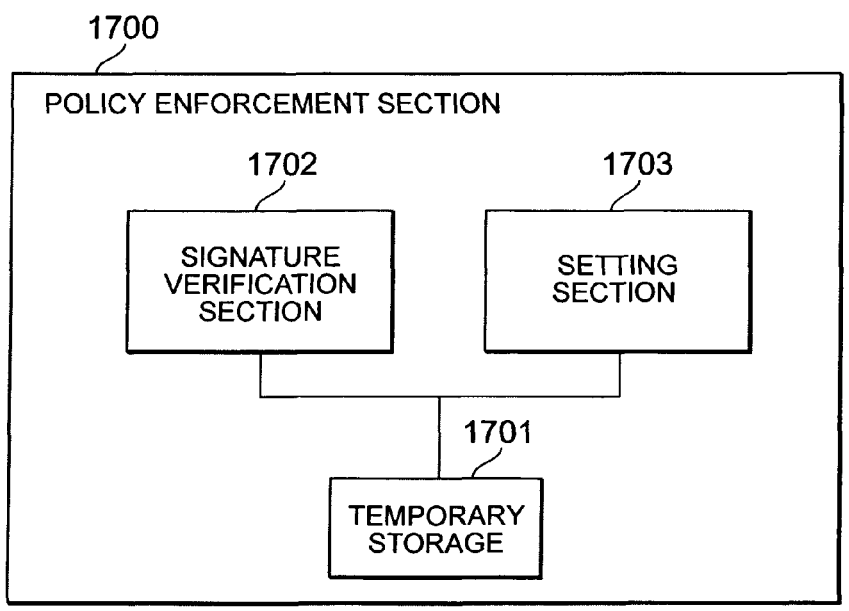
FIG. 4B is a block diagram showing a configuration of a policy enforcement section in the access right management system according to the first exemplary embodiment of the present invention.

Referring to FIG. 4B, the policy enforcement section 1700 includes: a temporary storage 1701 for temporarily storing work data; a signature verification section 1702; and a setting section 1703.

The policy enforcement section 1700 stores a resource-sharing policy input from the policy editing section 1100 in the temporary storage 1701. Thereafter, the signature verification section 1702 conducts verification of digital signatures on every policy unit included in the resource-sharing policy stored in the temporary storage 1701 and determines whether or not each policy unit has been agreed on.

The setting section 1703 converts the resource-sharing policy in the temporary storage 1701 into a predetermined access right description format and sets the resource-sharing policy on the shared resources 20.

Next, operation of the access right management device 10 in the present exemplary embodiment will be described in detail with reference to FIG. 1 and the flow charts of FIGS. 5 and 6.

Incidentally, in the following description, it is assumed that an access right management device 10-A is used by an administrator Admin(A) of a domain A, and similarly access right management devices 10-B and 10-C are used by administrators Admin(B) and Admin(C) of domains B and C, respectively. Moreover, it is assumed that these three administrators Admin(A) to Admin(C) negotiate and formulate a resource-sharing policy regarding shared resources 20-A to 20-C, which are provided by the domains A to C, respectively.

First, a new resource-sharing policy is created by the access right management device of any one of the above-mentioned three administrators Admin(A) to Admin(C) (Step 501 in FIG. 5). For example, in the case where a new resource-sharing policy is created by the access right management device 10-A of the administrator Admin(A), the policy editing section 1100 of the access right management device 10-A displays a screen as shown in FIG. 8 to the administrator Admin(A) through the output section 1103 and, while accepting operations to edit the policy from the administrator Admin (A), creates a new resource-sharing policy in the temporary storage 1102.

In this event, to simplify the work of editing the resource-sharing policy, the policy editing section 1100 can acquire domain information including the group members belonging to the domains A to C, which share resources, from the group management section 1200 and output the acquired domain information to the output section 1103. The policy editing section 1100 can also acquire resource information including the names of the shared server computers and the like belonging to the domains A to C from the shared resource management section 1300 and output the acquired resource information to the output section 1103.

In addition, the resource-sharing policy created here includes at least the following information and, preferably, has a description format in conformity with XML syntax as shown in FIG. 9, for example.

(1) An identification name of an access right management device engaged in creating a policy (e.g., IP address or the like of the access right management device 10-A).

(2) The date and time when the policy is created, or the version number of the policy.

(3) At least one "policy unit" composed of a set of three elements: a subject, an object, and an action.

Next, the administrator Admin(A) performs processing for registering the newly created resource-sharing policy (Step 502). In this event, the policy editing section 1100 of the access right management device 10-A outputs the resource-sharing policy stored in the temporary storage 1102 into the policy management section 1400, in response to an instruction to register a policy, which is given by, for example, the administrator Admin(A) pressing a register button on the screen example shown in FIG. 8. The policy management section 1400 stores the input resource-sharing policy in the secondary storage device. At this time, all policy units in this resource-sharing policy are "yet to be agreed" and stored with no digital signature affixed to any of the XML elements corresponding to the policy units, as seen in the example shown in FIG. 9.

Further, the administrator Admin(A) performs negotiation processing to obtain an agreement on the registered resource-sharing policy from the other administrators Admin(B) and Admin(C) (Step 503). In this event, the policy editing section 1100 of the access right management device 10-A inputs the resource-sharing policy stored in the temporary storage 1102 or the policy management section 1400 into the policy negotiation section 1500, in response to an instruction to negotiate a policy, which is given by, for example, the administrator Admin(A) pressing a negotiate button on the screen example shown in FIG. 8. At this time, the policy negotiation section

1500 carries out the negotiation processing to obtain an agreement, through a procedure shown in the flow chart of FIG. 6.

Specifically, first, the policy negotiation section 1500 inputs the resource-sharing policy into the negotiation information generation section 1600 in order to identify a policy unit to be negotiated and an access right management device with the administrator of which negotiation is required (Step 601 in FIG. 6). At this time, the negotiation information generation section 1600 stores the resource-sharing policy in the temporary storage 1601, and the policy unit extraction section 1602, while referring to each policy unit in the resource-sharing policy stored in the temporary storage 1601, extracts a policy unit or polity units which are yet to be agreed on (yet-to-be-agreed policy units) from the temporary storage 1601 (Step 602).

Figure 10:
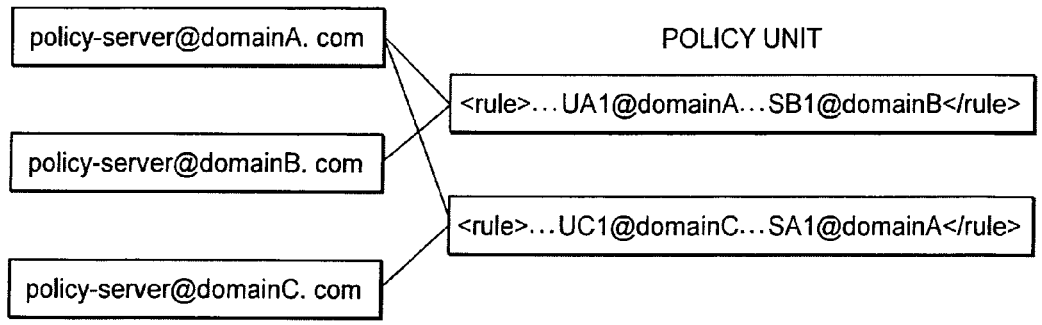
FIG. 10 is a diagram showing an example of a form in which the negotiation information generation section stores information on domains and policy units, in the first exemplary embodiment of the present invention.

Then, while referring to each yet-to-be-agreed policy unit in the temporary storage 1601, the negotiating-partner identification section 1603, for each yet-to-be-agreed policy unit, acquires domain information and resource information, which correspond to a subject and an object respectively, by inquiring of the group management section 1200 and the shared resource management section 1300 respectively and, from the acquired domain information and resource information, extracts an identification name (preferably, DNS name, IP address, or the like) of the access right management device 10-B or 10-C the administrator of which is a negotiating partner. The negotiating-partner identification section 1603 then stores the identification name in association with the corresponding yet-to-be-agreed policy unit in the temporary storage 1601 as shown in FIG. 10 (Step 603).

Thereafter, the negotiation information generation section 1600 scans the temporary storage 1601 and, for each of the identification names of the access right management devices 10-B and 10-C, extracts the yet-to-be-agreed policy unit or units associated with the identification name in question. The negotiation information generation section 1600 generates negotiation information including the identification name and at least one yet-to-be-agreed policy unit, as shown in FIG. 11 for example, and outputs the negotiation information to the policy negotiation section 1500 (Step 604).

Next, the policy negotiation section 1500 stores all pieces of such negotiation information obtained from the negotiation information generation section 1600 in the temporary storage 1501. Thereafter, while referring to each piece of negotiation information stored in the temporary storage 1501, the transmission section 1502 identifies the IP address of the access right management device 10-B or 10-C based on the identification name included in the piece of negotiation information in question and sends the piece of negotiation information to the access right management device 10-B or 10-C (Step 605). All yet-to-be-agreed policy units included in the pieces of negotiation information are negotiated among the three administrators Admin(A) to Admin(C) to obtain agreed policy units, with which the policy negotiation section 1500 updates the resource-sharing policy of the access right management devices 10-A to 10-C (Step 606 and Step 607).

Step 605 through Step 607 will be described in more detail by using a specific example, with reference to FIGS. 6 and 12. It is assumed that the processing up to Step 604 has been done now, with the negotiation information shown in FIG. 11 having been generated. Referring to a list of identification names of access right management devices in this negotiation information, it can be seen that negotiation is required between the access right management device 10-A (identification name: policy-server@domainA.com) and the access right management device 10-B (identification name: policy-server@domainB.com). Therefore, the transmission section 1502 of the access right management device 10-A sends the negotiation information in question to the access right management device 10-B (Step 605).

Figure 12:
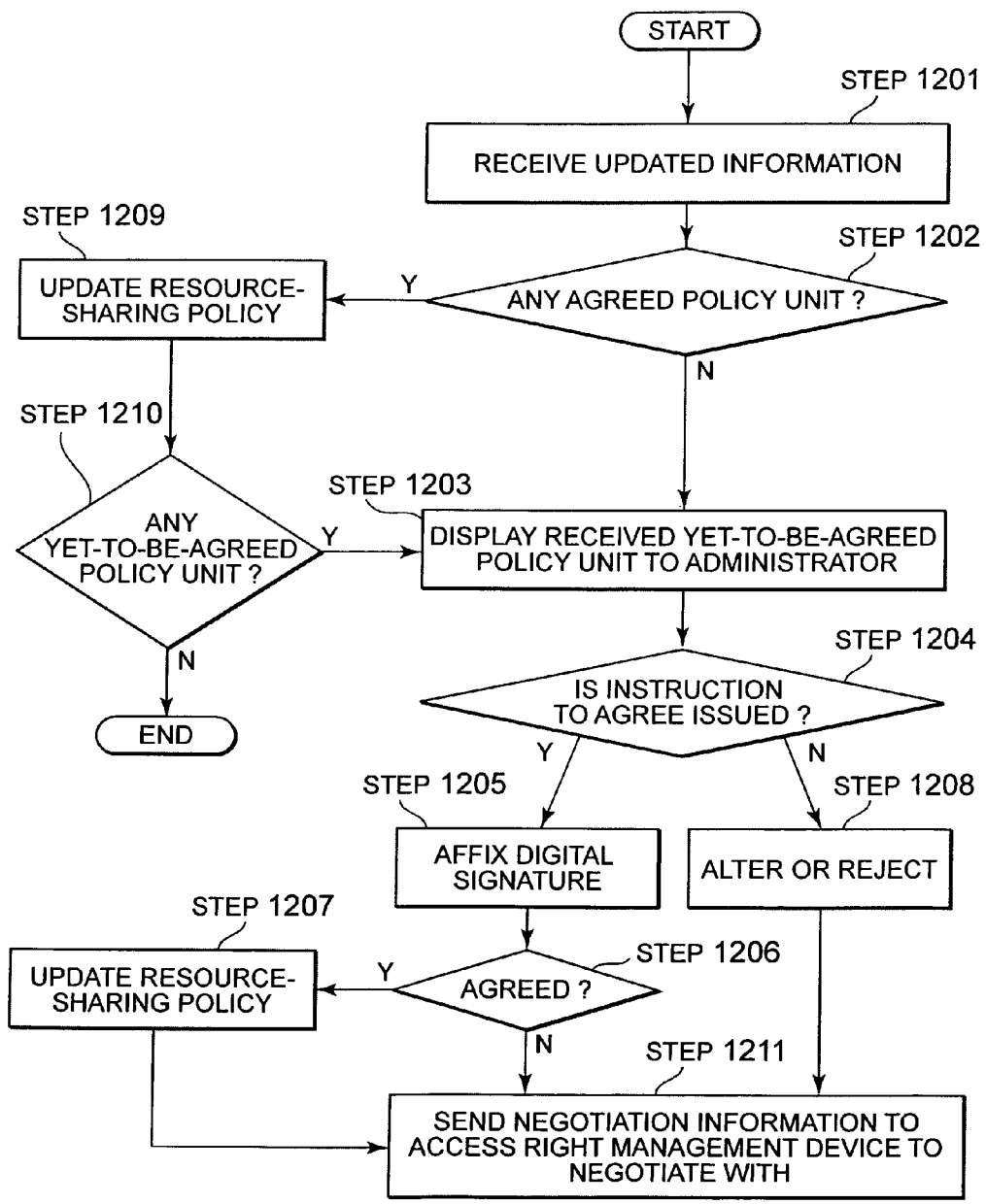
FIG. 12 is a flow chart showing the details of process steps for negotiating a yet-to-be-agreed policy unit performed by the policy negotiation section, in the first exemplary embodiment of the present invention.

The access right management device 10-B receives the negotiation information through the reception section 1503 of the policy negotiation section 1500 and stores it in the temporary storage 1501 (Step 1201 in FIG. 12). Thereafter, the signature verification section 1507 verifies the presence or absence of a digital signature and the legitimacy thereof, while referring to a yet-to-be-agreed policy unit included in the negotiation information stored in the temporary storage 1501 (Step 1202).

Figure 13:
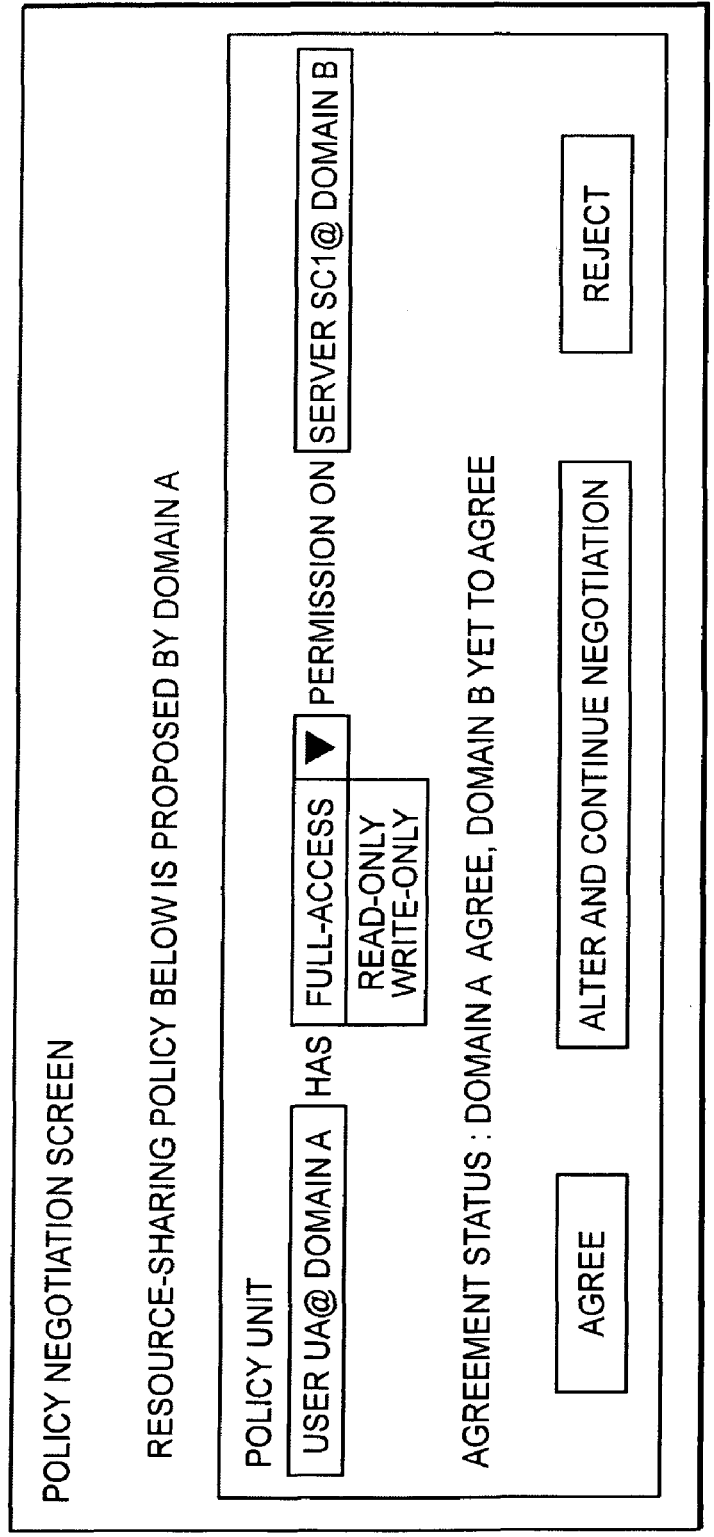
FIG. 13 is a diagram showing an example of a negotiation screen displayed by the policy negotiation section, in the first exemplary embodiment of the present invention.

Since no digital signature is affixed to the yet-to-be-agreed policy unit here, the signature verification section 1507 determines that this policy unit certainly is yet to be agreed on, and presents a display, for example, as shown in FIG. 13 to the administrator Admin(B) through the output section 1504 (Step 1203).

When the contents of the yet-to-be-agreed policy unit are confirmed by the administrator Admin(B), an instruction to agree is entered through the input section 1505 by an operation such as pressing an agree button (Step 1204).

In the case where the instruction to agree is entered, the signature affixation section 1506 affixes a digital signature of the administrator Admin(B) to the yet-to-be-agreed policy unit and updates the yet-to-be-agreed policy unit in the negotiation information stored in the temporary storage 1501 (Step 1205).

Thereafter, digital signature verification is performed on the updated policy unit by the signature verification section 1507. Since no digital signature of the administrator Admin (A) is affixed, it is determined that this policy unit is still a yet-to-be-agreed policy unit (Step 1206). Then, the transmission section 1502 sends the negotiation information stored in the temporary storage 1501 to the access right management device 10-A (Step 1211), the negotiation information including the yet-to-be-agreed policy unit with the digital signature of the administrator Admin(B) affixed thereto (see FIG. 14).

On the other hand, in the case where the administrator Admin(B) does not agree on the yet-to-be-agreed policy unit, the administrator Admin(B) can enter an instruction to reject the yet-to-be-agreed policy unit or can make a change (such as addition, alteration, or deletion) in the yet-to-be-agreed policy unit through the input section 1505 (Step 1208).

If an instruction to reject is entered by an operation such as pressing a reject button in Step 1208, the policy negotiation section 1500 deletes the rejected policy unit from the negotiation information in the temporary storage 1501 and then sends the negotiation information to the access right management device 10-A through the transmission section 1502 (Step 1211).

Alternatively, if an alteration is made in the yet-to-be-agreed policy unit through the input section 1505, the policy negotiation section 1500 replaces the yet-to-be-agreed policy unit in the negotiation information stored in the temporary storage 1501 with zero or more altered yet-to-be-agreed policy unit(s), and then sends the negotiation information to the access right management device 10-A through the transmission section 1502 (Step 1211).

Incidentally, the following procedure is also possible in Step 1208. Specifically, after an alteration is made in the yet-to-be-agreed policy unit, it is checked whether or not a subject and/or an object other than the domains A and B are included in the altered yet-to-be-agreed policy unit.

Figure 15:
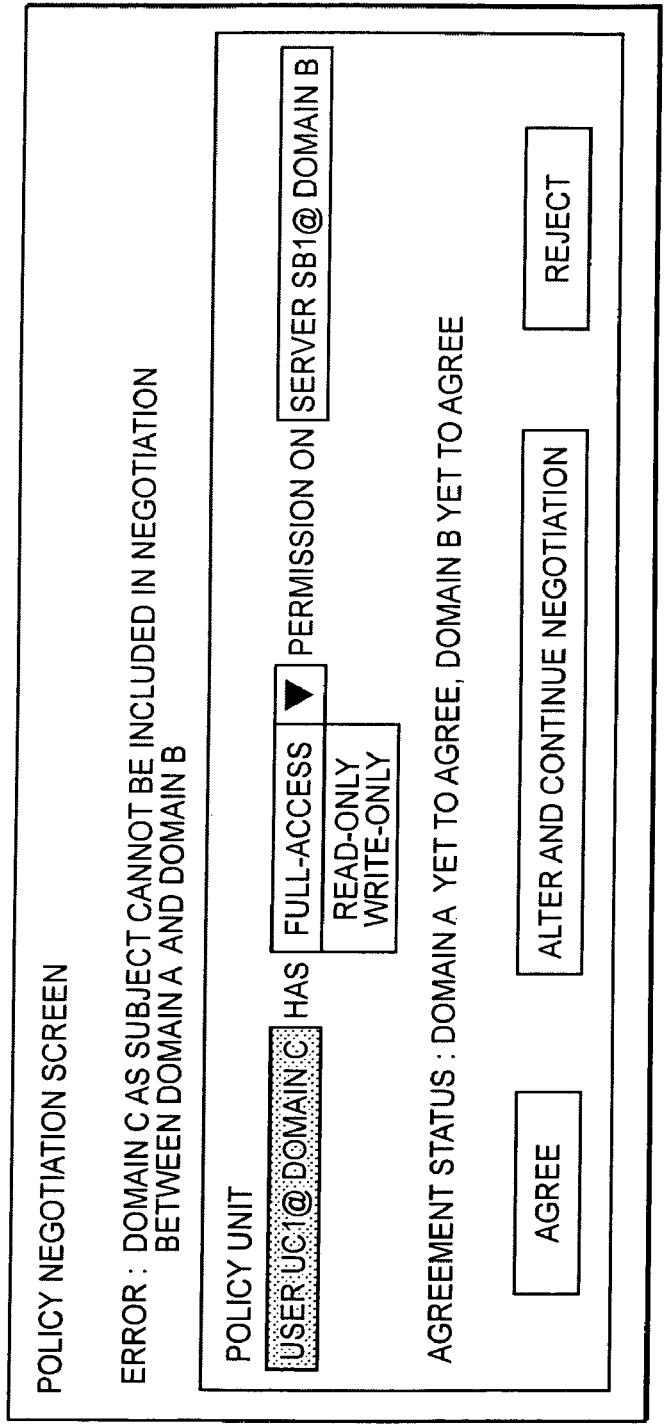
FIG. 15 is a diagram showing an example of an error screen displayed by the policy negotiation section, in the first exemplary embodiment of the present invention.

If, for example, a subject such as "UC1@domainC" is included, it is determined that the alteration made is an error, and another alteration is requested of the administrator Admin(B) (see FIG. 15). FIG. 15 shows an example of an error message displayed at the access right management device 10-C to the administrator Admin(C) of the domain C.

Figure 16:
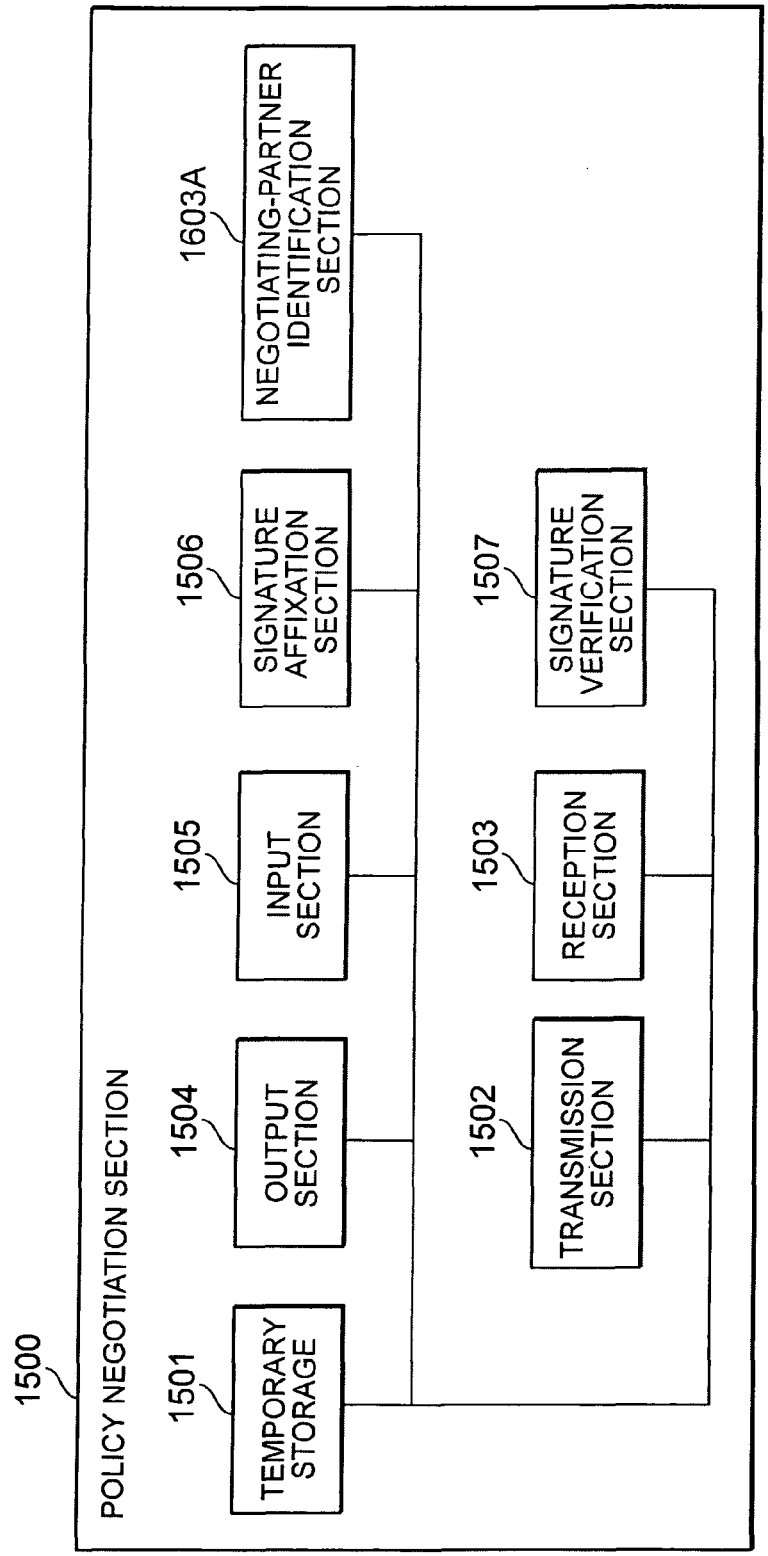
FIG. 16 is a block diagram showing another configuration of the policy negotiation section in the first exemplary embodiment of the present invention.

Such a check can be implemented by allowing the policy negotiation section 1500 to include a negotiating-partner identification section 1603A having a function equivalent to the negotiating-partner identification section 1603 of the negotiation information generation section 1600 (see FIG. 16). Even if the administrators Admin(A) and Admin(B) agree on a policy unit including a subject or an object belonging to the domain C, such a policy unit leads to the creation of a resource-sharing policy that eventually cannot be set on the shared resource 20 by the undermentioned operation of the policy enforcement section 1700. However, such a failure can be prevented in advance by implementing the above-described check.

Next, when the reception section 1503 of the policy negotiation section 1500 of the access right management device 10-A has received the negotiation information sent from the access right management device 10-B, the received negotiation information is updated through the operations as performed in Step 1201 through Step 1209 described above, and the updated negotiation information is sent to the access right management device 10-B again.

In Step 1204, when the administrator Admin(A) issues an instruction to agree on the yet-to-be-agreed policy unit to which the digital signature of the administrator Admin(B) is affixed, the signature affixation section 1506 further affixes a digital signature of the administrator Admin(A) to this policy unit (Step 1205). Subsequently, the signature verification section 1507 determines that this policy unit is an "agreed policy unit" and inputs the policy unit into the policy management section 1400 (Step 1206), and the policy management section 1400 updates the resource-sharing policy with this agreed policy unit (Step 1207). The transmission section 1502 then sends the negotiation information including this agreed policy unit to the access right management device 10-B again (Step 1211).

Thereafter, when the reception section 1503 of the policy negotiation section 1500 of the access right management device 10-B has received the negotiation information, the signature verification section 1507 detects the agreed policy unit (Step 1202). At this time, the signature verification section 1507 inputs the agreed policy unit included in the received negotiation information into the policy management section 1400, which then updates the resource-sharing policy (Step 1209).

Thereafter, it is determined whether or not a yet-to-be-agreed policy unit is included in the negotiation information (Step 1210). If included, the yet-to-be-agreed policy unit is input to the output section 1504, and then the processing after Step 1203 is continued as described above. On the other hand, if no yet-to-be-agreed policy unit is included, it is determined that the policy negotiation is complete, and the processing is finished.

Lastly, the resource-sharing policy is forcefully set on the shared resources 20-A of the domain A at an instruction from the administrator Admin(A), by using the policy editing section 1100 of the access right management device 10-A (Step 608). In this event, the policy editing section 1100 of the access right management device 10-A inputs the resource-sharing policy which the administrator Admin(A) instructs to enforce, into the policy enforcement section 1700.

The policy enforcement section 1700 stores the input resource-sharing policy in the temporary storage 1701. Thereafter, the signature verification section 1702, while referring to every policy unit included in the resource-sharing policy in the temporary storage 1701, checks which domain each of the subject and object belongs to by inquiring of the group management section 1200 and the shared resource management section 1300, and verifies the presence or absence of digital signatures of the administrators of the obtained domains.

For example, in the case where the domain A, "UA1@domainA," and the domain B, "SB1@domainB," are presented as a subject and an object respectively, it is verified whether a digital signature of the administrator Admin(A) and a digital signature of the administrator Admin(B) are both affixed. When at least one of the digital signatures is absent, it is determined that a yet-to-be-agreed policy unit is included, and the subsequent processing is discontinued.

Only when it is determined that all the policy units have been agreed on, the setting section 1702 converts the resource-sharing policy in question into a predetermined access right description format (e.g., IP filtering rule or the like) and sets the resource-sharing policy on the shared resources 20-A.

Effects of the First Exemplary Embodiment

Next, effects of the above-described first exemplary embodiment will be discussed According to the first exemplary embodiment, the system is configured such that, when a resource-sharing policy is newly created by the policy editing section 1100 of the access right management device 10, the negotiation information generation section 1600 of the access right management device 10, for each policy unit in the resource-sharing policy, identifies an access right management device with the domain administrator of which negotiation is required, and generates negotiation information. Accordingly, it is possible to accomplish efficient policy negotiation involving a minimum number of negotiating partners and using a minimum amount of policy description.

Moreover, the system is configured such that, when the policy editing section 1100 alters one or more of the policy units in an agreed resource-sharing policy or adds at least one policy unit to an agreed resource-sharing policy, the policy editing section 1100 alters or adds the policy unit in question as a yet-to-be-agreed policy unit to which no digital signature is affixed, and the negotiation information generation section 1600 generates negotiation information only regarding the yet-to-be-agreed policy unit. Accordingly, it is possible to accomplish renegotiation limited to the altered or added part, with no need to negotiate again those policy units which have been already agreed.

Incidentally, the system may also be configured such that the negotiation information generation section 1600 includes the signature affixation section 1506, whereby a digital signature of the administrator of its own domain (administrator Admin(A) in the above-described example) is automatically affixed to a yet-to-be-agreed policy unit stored in the temporary storage 1601, in the operation at Step 602. Even if the system is configured as described above, since it is hardly conceivable that a domain administrator does not agree on a policy unit that the domain administrator him/herself has generated, it is possible to reduce the number of communications of negotiation information involved in policy negotiation by at least one, without lowering the level of security.

Second Exemplary Embodiment

Figure 17:
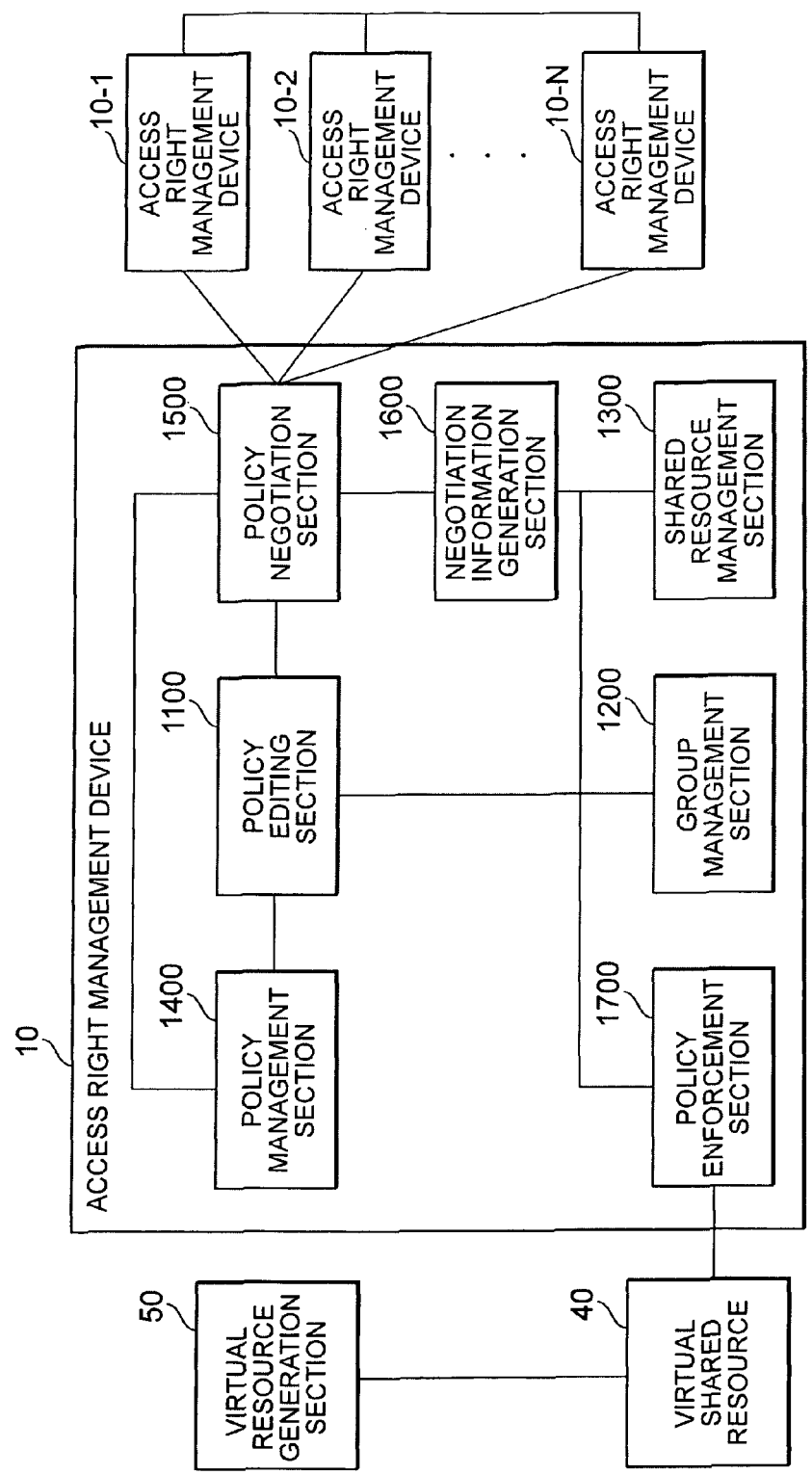
FIG. 17 is a block diagram showing a configuration of an access right management system according to a second exemplary embodiment of the present invention.

Referring to FIG. 17, an access right management system according to a second exemplary embodiment of the present invention includes virtual shared resources 40 and a virtual resource generation section 50 in place of the shared resources 20 in the first exemplary embodiment.

A virtual shared resource 40 is a virtual computer or network equipment, such as a virtual server, virtual PC, or virtual router, operating on a virtual machine monitor or host OS.

When a domain desires to share a computer or network equipment with another domain, the virtual resource generation section 50 generates and places a virtual shared resource 40 in a server pool provided with a virtual machine monitor and/or host OS, in accordance with a designation made by a domain administrator. Moreover, the virtual resource generation section 50 registers an identification name or the like of the generated virtual shared resource 40 with the shared resource management section 1300 of the access right management device 10.

The shared resource management section 1300 of the access right management device 10 stores identification names of the virtual shared resources 40. Additionally, the policy enforcement section 1700 has a function of setting a resource-sharing policy on the virtual shared resources 40.

Operation of the access right management device 10 in the second exemplary embodiment is the same as in the first exemplary embodiment. The virtual shared resources 40 operate as the physical shared resources 20 do, in the point of control of access to a network, file, AP, and the like. Hereinafter, operation of the virtual resource generation section 50 will be described in detail by using a specific example.

First, when an administrator Admin(A) of a domain A desires to newly share a computer resource with an administrator Admin(B) of another domain B, the administrator Admin(A) instructs the virtual resource generation section 50 to generate a virtual computer. Then, the virtual resource generation section 50 generates a VM image representing the contents of a memory or storage of the virtual computer in a serial manner, in a secondary storage device that the virtual resource generation section 50 includes in itself. In this event, it is also possible to use a method in which the administrator Admin(A) makes a selection from VM image templates prepared in advance, the VM image templates including applications and the like required for sharing.

Next, the virtual resource generation section 50 places the generated VM image in a server computer in a server pool provided with a predetermined virtual machine monitor and/or host OS, and instructs to allow the new virtual shared resource to operate. In this event, it is also possible to select a less-loaded server computer as the place for the VM image to be placed in, based on the distribution of loads on server computers in the server pool.

The virtual resource generation section 50 then inquires and acquires an identification name (IP address or the like) assigned to the virtual shared resource from the server computer where the VM image is placed, and registers this identification name as a shared resource of the domain A, with the shared resource management section 1300 of the access right management device 10-A. Moreover, the identification name is also registered with the shared resource management section 1300 of the access right management device 10-B of the domain B, which is the other sharing party.

Effects of the Second Exemplary Embodiment

According to the second exemplary embodiment, every resource shared between domains is a virtual shared resource 40. Therefore, because of the shielding characteristic guaranteed by the virtual machine monitor or host OS, that is, the characteristic by which the virtual shared resource 40, unless permitted by a policy, cannot gain access to or cannot be accessed by virtual resources shared with other domains and proprietary resources in its own domain, it is possible to prevent threats, such as the expansion of an infection caused by a worm attack to other resources, which may occur along with resource sharing, and malicious stealing of information stored in a shared resource by a non-group member in an office.

Third Exemplary Embodiment

Figure 18:
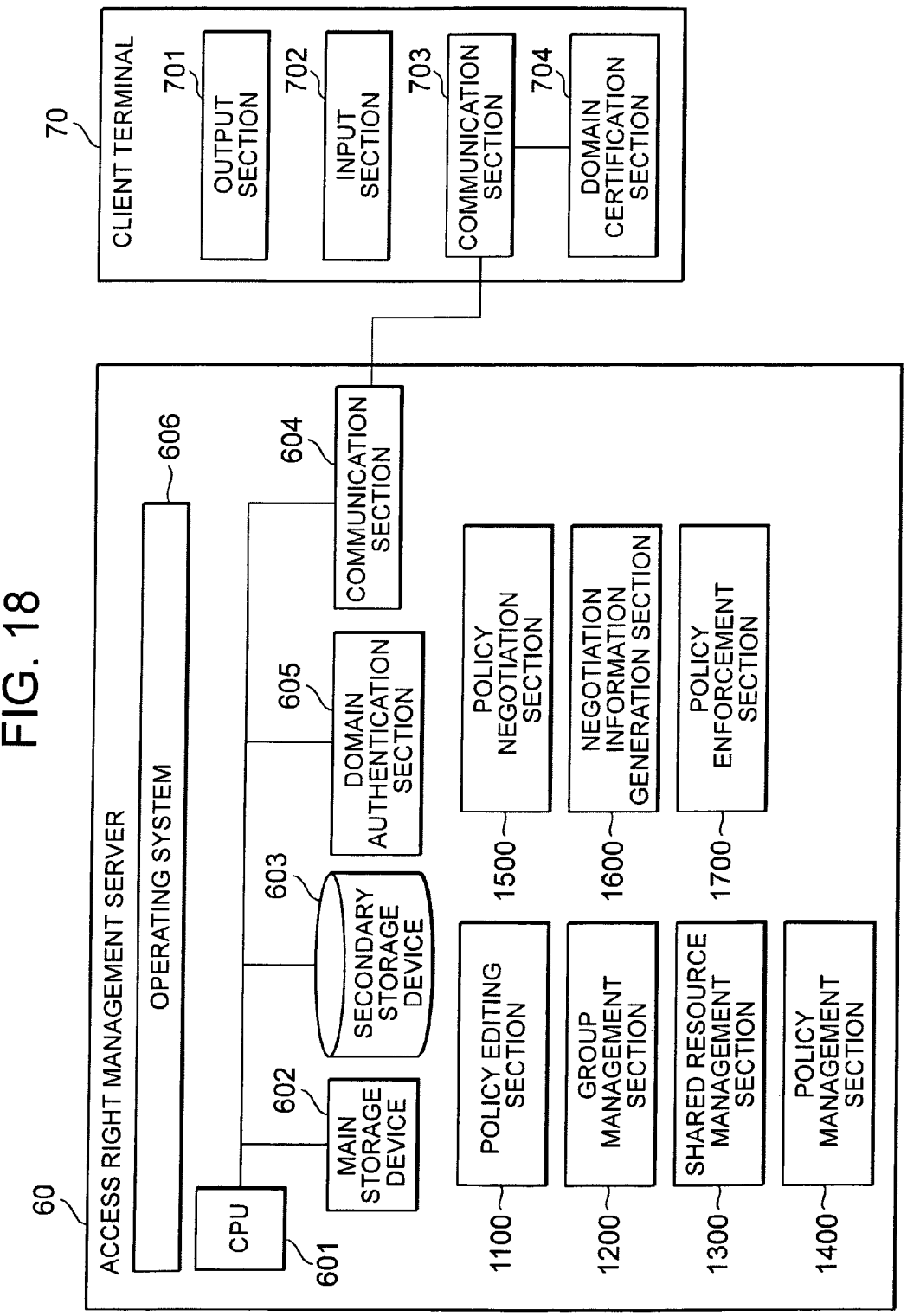
FIG. 18 is a block diagram showing a configuration of an access right management system according to a third exemplary embodiment of the present invention.

Referring to FIG. 18, an access right management system according to a third exemplary embodiment of the present invention includes an access right management server 60 and a client terminal 70, with a structure in which the access right management devices 10 in any one of the first and second exemplary embodiments are consolidated into the single access right management server.

The access right management server 60 includes: a central processor (CPU) 60 performing program control; a main storage device 602; a secondary storage device 603; a communication section 604 for controlling communication with the client terminal 70; a domain authentication section 605 for authenticating that the client terminal 70 belongs to a domain; and an operating system 606. Further, the access right management server 60 also includes: a policy editing section 1100; a group management section 1200; a shared resource management section 1300; a policy management section 1400; a policy negotiation section 1500; a negotiation information generation section 1600; and a policy enforcement section 1700, which are all implemented in a software manner by using corresponding programs stored in the secondary storage device 603.

The client terminal 70 is placed in each domain and includes: an output section 701 such as a LCD; an input section 702 such as a keyboard and mouse; a communication section 703 for controlling communication with the access right management server 60; and a domain certification section 704.

Operation of the access right management system according to the third exemplary embodiment will be described in detail by using a specific example.

First, when an administrator Admin(A) of a domain A gives an instruction for policy manipulation, such as to edit, negotiate, or enforce a policy, through the input section 702 of the client terminal 70, the client terminal 70 sends a request for policy manipulation to the access right management server 60 through the communication section 703. Note that, when the communication section 703 sends the request for policy manipulation to the access right management server 60, the communication section 703 includes domain authentication information stored in the domain certification section 704, into the request massage for transmission.

When the access right management server 60 has received the request for policy manipulation through the communication section 604, the domain authentication section 605 checks the domain authentication information included in the request for policy manipulation and authenticates that the domain to which the client terminal 70 belongs is the domain A. If authentication fails, the processing is terminated straight away without performing the subsequent processing.

A preferred example of the domain authentication information is a public key certification based on the public key infrastructure (PKI). In this case, the domain authentication section 605 verifies the legitimacy of a public key certification. As another preferred example, a hardware authentication mechanism in the trusted platform module (TPM) may be applied.

Thereafter, the access right management server 60 loads into the main storage device 602, through the operating system 606, the policy editing section 1100, group management section 1200, shared resource management section 1300, policy management section 1400, policy negotiation section 1500, negotiation information generation section 1600, and policy enforcement section 1700, which are implemented by using the programs stored in the secondary storage device 603. The access right management server 60 thus generates an access right management process for the domain A and inputs the request for policy manipulation.

The generated access right management process emulates the operation of the access right management device 10 in the first or second exemplary embodiment. Moreover, when the policy negotiation section 1500 communicates with the policy negotiation section 1500 of a domain B, an access right management process for the domain B is similarly generated.

Effects of the Third Exemplary Embodiment

According to the third exemplary embodiment, by virtue of the structure and configuration as described above, the access right management server 60 can be operated by a third party irrelevant to those domains sharing a resource. Accordingly, it is possible to provide ASP-type access right management services.

Note that the system also may be configured such that the group management section 1200, shared resource management section 1300, and policy management section 1400 can be individually executed, each as an independent process, whereby a resource can be shared through an arbitrary access right management process. By doing so, it is possible to use the main storage device 602 and the secondary storage device 603 of the access right management server 60 more efficiently.

Figure 19:
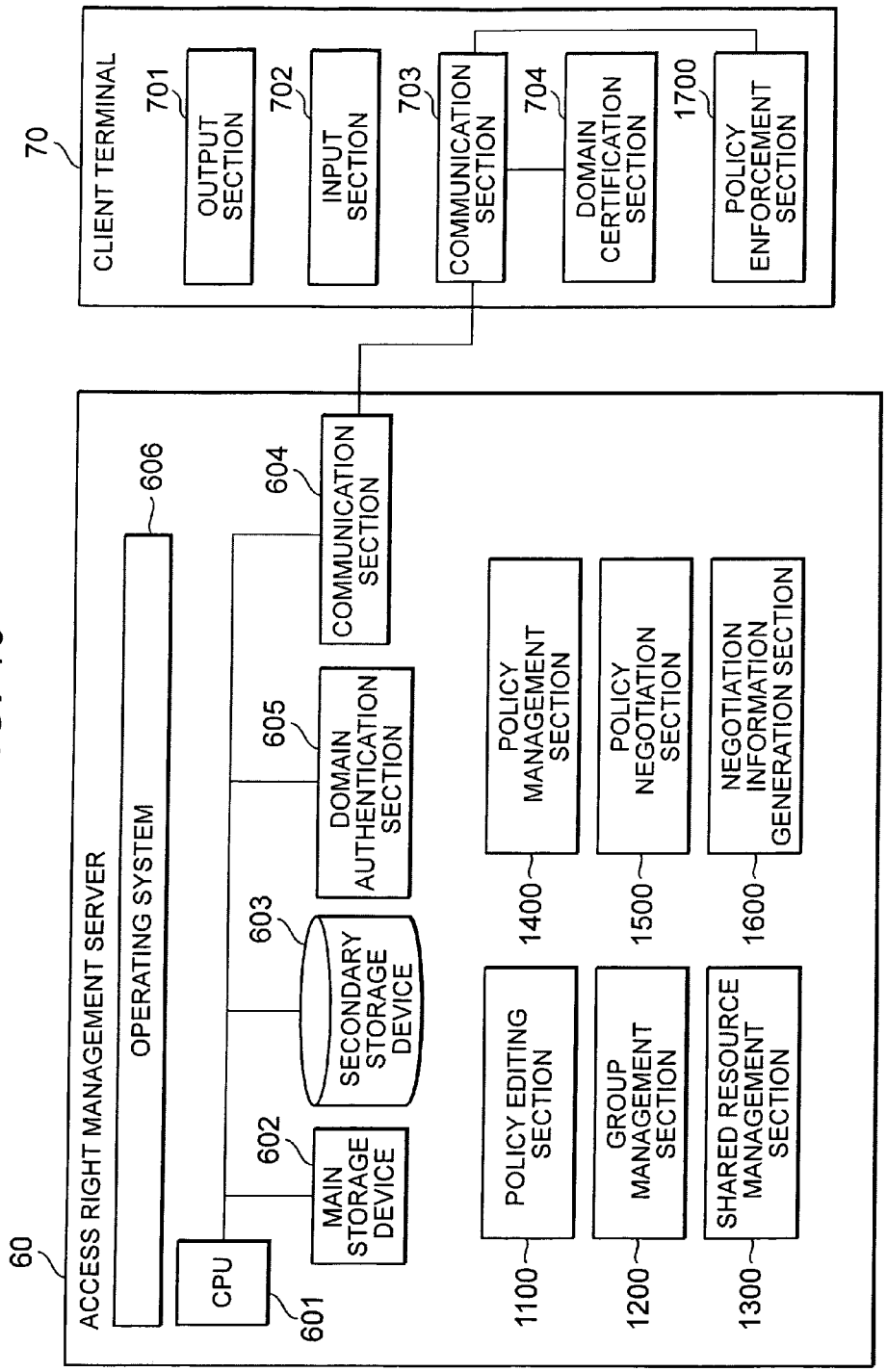
FIG. 19 is a block diagram showing another configuration of an access right management server in the third exemplary embodiment of the present invention.

In addition, the policy enforcement section 1700 may be provided to the client terminal 70, as shown in FIG. 19. By doing so, it is sufficient for the shared resources 20 or virtual shared resources 40 to accept policy enforcement from the client terminal 70 located in its own domain, which can make the structure safer.

Fourth Exemplary Embodiment

Figure 20:
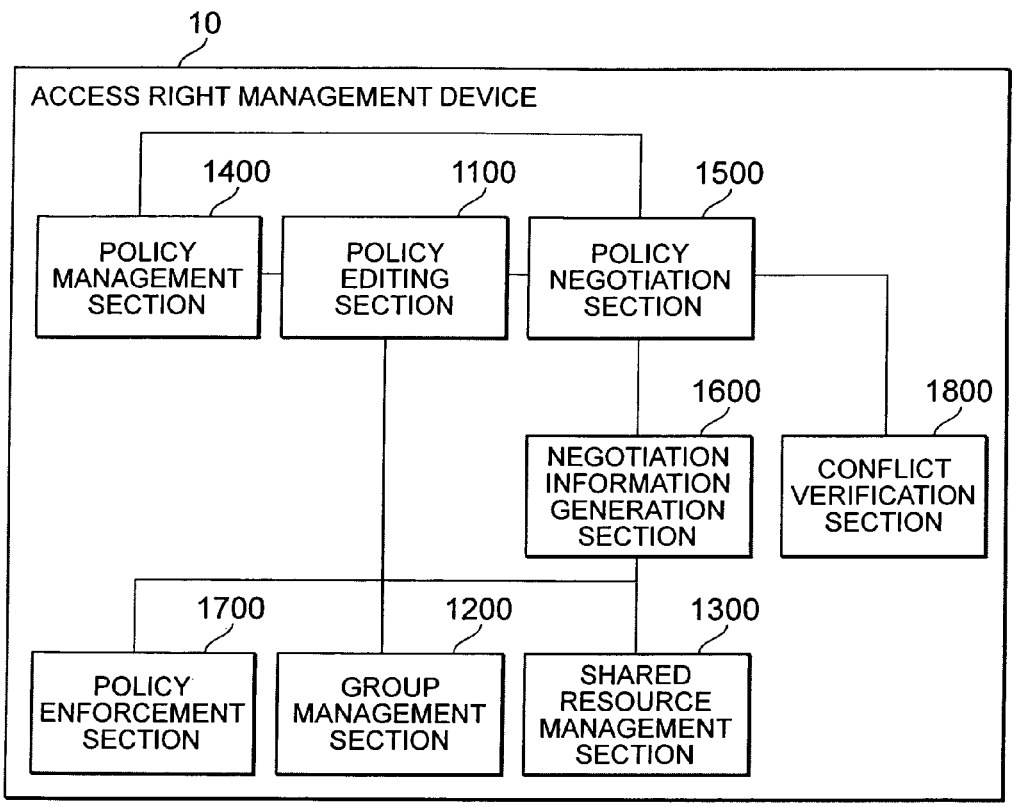
FIG. 20 is a block diagram showing a configuration of an access right management system according to a fourth exemplary embodiment of the present invention.
Figure 21:
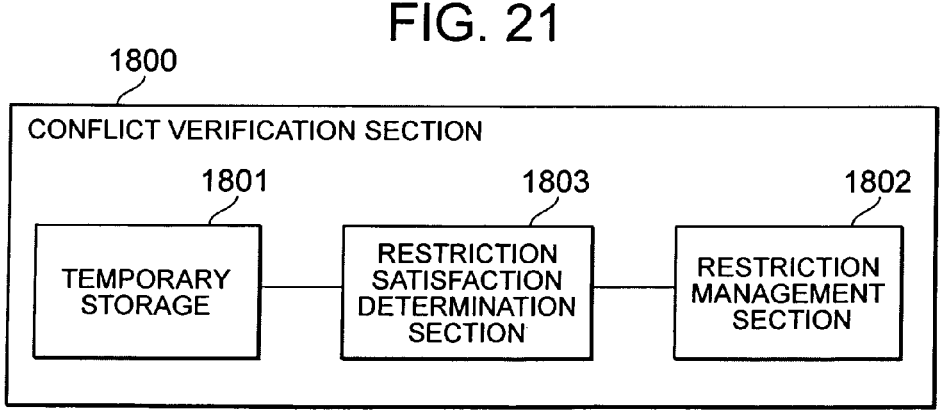
FIG. 21 is a block diagram showing a configuration of a conflict verification section in the fourth exemplary embodiment of the present invention.

Referring to FIGS. 20 and 21, an access right management system according to a fourth exemplary embodiment of the present invention has a configuration similar to the systems according to the first and second exemplary embodiments but is different in the point that an access right management device 10 includes a conflict verification section 1800 in addition to the configurations of the access right management devices 10 in the first and second exemplary embodiments.

This conflict verification section 1800 includes: a temporary storage 1801; a restriction management section 1802 storing predetermined restrictive conditions; and a restriction satisfaction determination section 1803.

When negotiation information is input from the policy negotiation section 1500, the conflict verification section 1800 stores all policy units included in the negotiation information in the temporary storage 1801. Thereafter, the restriction satisfaction determination section 1803 compares each policy unit stored in the temporary storage 1801 with the restrictive conditions acquired from the restriction management section 1802, determines whether or not the restrictive conditions are satisfied, and outputs a result of this determination to the output section 1504 of the policy negotiation section 1500.

Figure 22:
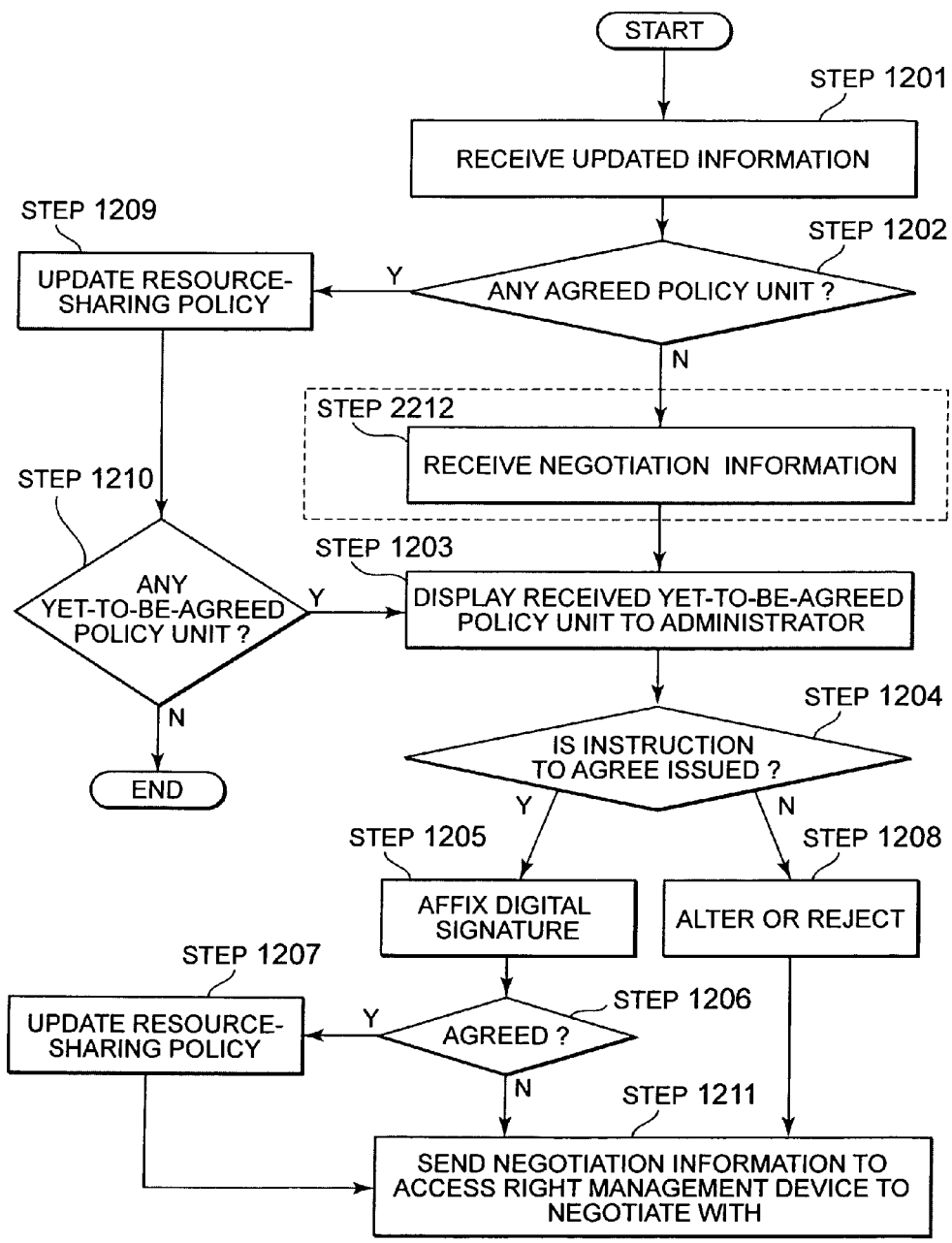
FIG. 22 is a flow chart showing the details of process steps for negotiating a yet-to-be-agreed policy unit performed by the policy negotiation section, in the fourth exemplary embodiment of the present invention.

Operation of the access right management device 10 in the fourth exemplary embodiment will be described in detail by using a specific example, with reference to FIG. 22. In the flow chart of FIG. 22, the same steps as in FIG. 12 are denoted by the same reference numerals as in FIG. 12.

Figure 23:
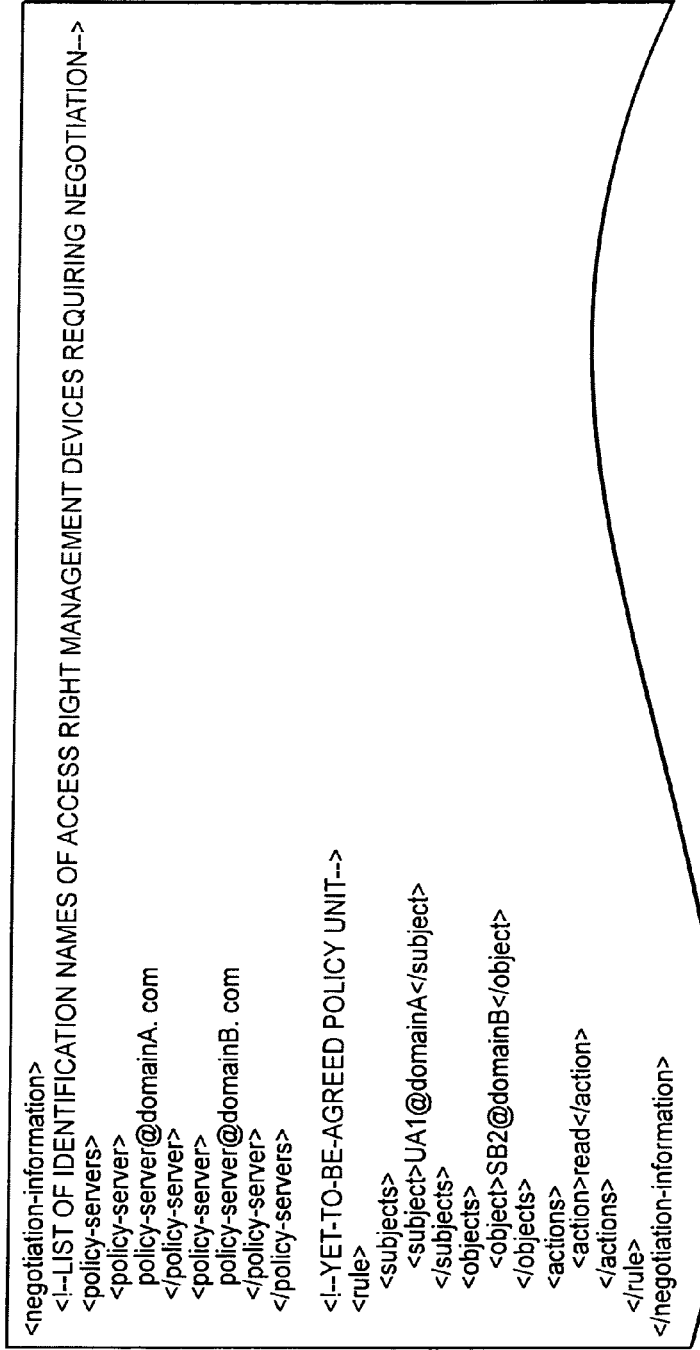
FIG. 23 is a diagram showing another example of negotiation information in the fourth exemplary embodiment of the present invention.

It is assumed that an access right management device 10-B of an administrator Admin(B) of a domain B has now received negotiation information including a policy unit as shown in FIG. 23 from an access right management device 10-A of an administrator Admin(A) of a domain A. Moreover, it is assumed that, as a security policy unique to his/her own domain, the administrator Admin(B) has described in advance restrictive conditions including: attribute definitions (such as an identification name, a role, and a security label) for each element (a subject, an object, and an action) of a policy unit; restrictive equations related to the attributes; other variables; and the like, and has stored the restrictive conditions in the restriction management section 1802.

Figures 24, 25:
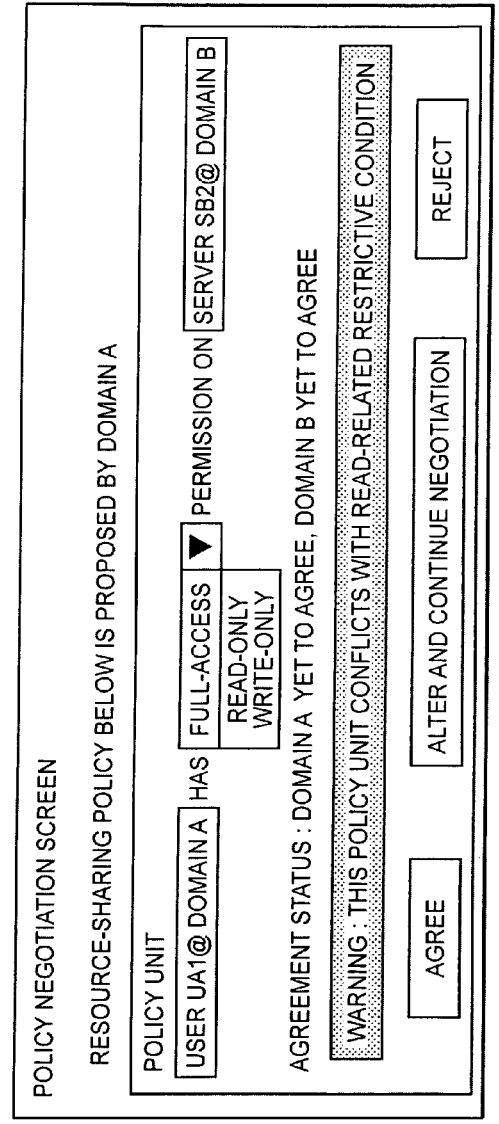
FIG. 24 is a diagram showing an example of restrictive conditions in the fourth exemplary embodiment of the present invention.
FIG. 25 is a diagram showing an example of a negotiation screen displayed by the policy negotiation section, in the fourth exemplary embodiment of the present invention.

Specific examples of the restrictive conditions include: as shown in FIG. 24 for example, what is described as restrictive equations using the definition of security label having partial order relation, which is assigned to respective group members and a shared resource; and an r-property (a subject having a more significant label can gain read access to an object having a less significant label, but the reverse is prohibited) and a *-property (a subject having a less significant label can gain write access to an object having a more significant label, but the reverse is prohibited), which are well known as the Bell-LaPadula model.

Here, after the policy negotiation section 1500 of the access right management device 10-B has received the negotiation information, in Step 2212 following Step 1202, the policy negotiation section 1500 inputs every yet-to-be-agreed policy unit included in the negotiation information stored in the temporary storage 1501 into the conflict verification section 1800 and thereby acquires conflict information indicating a conflict with the restrictive conditions.

Specifically, in Step 2212, first, the conflict verification section 1800 stores the yet-to-be-agreed policy unit or units to be checked in the temporary storage 1801. Thereafter, the restriction satisfaction determination section 1803 acquires the restrictive conditions from the restriction management section 1802. The restriction satisfaction determination section 1803 then evaluates the restrictive equations written in the restrictive conditions, by using each policy unit stored in the temporary storage 1801 as an input to the restrictive equations.

For example, using the example of the restrictive conditions shown in FIG. 24, it is detected that a policy unit included in the negotiation information (see FIG. 23) conflicts with the r-property. At this time, the restriction satisfaction determination section 1803 generates conflict information indicating, for example, "this policy unit conflicts with the read-related restrictive condition," and outputs the conflict information to the policy negotiation section 1500.

After the policy negotiation section 1500 has received the conflict information, in Step 1203, the policy negotiation section 1500 displays the conflict information along with the yet-to-be-agreed policy unit to give a warning to the administrator Admin(B) through the output section 1504 (see FIG. 25).

Effects of Fourth Exemplary Embodiment

By virtue of the configuration described above, the access right management system according to the fourth exemplary embodiment can prevent an administrator from making a misjudgment when he/she decides whether or not to agree on a yet-to-be-agreed policy unit.

(Various Aspects)

As described before, the first exemplary object of the present invention is to provide a system, a server, and a program for access right management that, when a service resource is shared between a plurality of domains, can assist domain administrators in efficiently and certainly establishing an agreement, at the formulation of an access policy regarding the shared service resource under the agreement between the domain administrators.

In addition, a second exemplary object of the present invention is to provide a system, a server, and a program for access right management that also can prompt required domain administrators to reach an agreement again on a counterproposal, or on an alteration made after an agreement is established.

According to claim 1, a system includes an access right management device, which is provided in each domain, for creating a resource-sharing policy and performing resource-sharing policy negotiation between a plurality of domain administrators, wherein the access right management device performs: for each policy unit of the resource-sharing policy, identifying an access right management device which is a negotiating partner about each policy unit; generating negotiation information including an identification name of the identified access right management device and the policy unit to be negotiated; and transmitting the negotiation information to the identified access right management device; and setting the resource-sharing policy on shared resource when having received an instruction to agree on every policy unit from the identified access right management device to which the negotiation information was sent.

According to claim 2, the access right management device comprises: a policy editing section for creating and editing the resource-sharing policy; a group management section for storing domain information including identification names of users, domain administrators and the access right management device involved in resource sharing and relations with domains; a shared resource management section for storing an identification name of shared resource and the domain which are associated with each other; a negotiation information generation section for extracting from the resource-sharing policy the policy unit to be negotiated with the domain which is a negotiating partner and generating the negotiation information by referring to the group management section and the shared resource management section; a policy negotiating section for performing negotiation to obtain an agreement with the identified access right management device on the policy unit of the resource-sharing policy; and a policy enforcement section for setting only an agreed resource-sharing policy on shared resource.

According to claim 3, when the policy editing section creates a new resource-sharing policy or alters a resource-sharing policy, the negotiation information generation section divides the resource-sharing policy into policy units and, for each policy unit, inquires of the group management section which domain the identification name of a user belongs to, or inquires of the shared resource management section which domain the identification name of a shared resource belongs to, thereby identifying a negotiating partner about the policy unit, and generates negotiation information including a list of identification names of involved access right management devices and at least one policy unit to be negotiated.

According to claim 4, the policy negotiation section sends the negotiation information generated by the negotiation information generation section to the access right management device included in the negotiation information and when an instruction to agree on the policy unit included in the negotiation information is obtained from the access right management device to which the negotiation information has been sent, a digital signature of a domain administrator of that access right management device is affixed to the policy unit.

According to claim 5, the policy negotiation section checks for presence of a digital signature and, when determining that the policy unit has been agreed on, updates the resource-sharing policy in question with the agreed policy unit.

According to claim 6, the shared resource is a virtual shared resource, wherein the system further comprises a virtual resource generation section for generating the virtual shared resource and registering information of generated virtual shared resource in the access right management device.

When the policy editing section creates a new resource-sharing policy or alters a resource-sharing policy, the negotiation information generation section divides the resource-sharing policy into constituent elements (policy units). For each policy unit, the negotiation information generation section inquires of the group management section which domain an identification name (subject) of a user belongs to, or inquires of the shared resource management section which domain an identification name (object) of a shared resource belongs to, thereby identifying a party to negotiate with (negotiating partner) about the policy unit. The negotiation information generation section generates negotiation information including a list of identification names of involved access right management devices and at least one policy unit to be negotiated.

Moreover, the policy negotiation section sends the negotiation information generated by the negotiation information generation section to the access right management device designated in the negotiation information. When an instruction to agree on the policy unit included in the negotiation information is issued by a domain administrator of the access right management device to which the negotiation information has been sent, a digital signature of this domain administrator is affixed to the policy unit. The policy negotiation section checks for a digital signature and, when determining that the policy unit has been agreed on, updates the resource-sharing policy in question with the agreed policy unit. The policy enforcement section sets the resource-sharing policy composed only of agreed policy units on the shared resources.

According to the present invention, the following effects can be achieved.

Since the configuration is made such that an access right management device of a domain with which negotiation is required is identified for each policy unit in a resource-sharing policy newly created and negotiation information is generated, it is possible to accomplish efficient policy negotiation, involving a minimum number of negotiating partners and using a minimum amount of policy description.

Moreover, when at least one policy unit is altered in or added to an agreed resource-sharing policy, the agreed resource-sharing policy is updated with the altered or added policy unit treated as a yet-to-be-agreed policy unit. Additionally, the configuration is made such that negotiation information is generated only regarding the yet-to-be-agreed policy unit. Accordingly, it is not needed to negotiate again those policy units which have been already agreed on, and it is possible to accomplish renegotiation limited only to the altered or added part.

The present invention is applicable to various uses such as access right management tools used by system administrators in companies, universities, colleges, etc., in various situations such as corporate alliances and industry-academy joint researches. Moreover, the present invention is also applicable to other uses such as access right management ASP services and policy negotiation agent ASP services, as kinds of security operation management services.

The present invention may be embodied in other specific forms without departing from the spirit or essential characteristics thereof. The above-described exemplary embodiments are therefore to be considered in all respects as illustrative and not restrictive, the scope of the invention being indicated by the appended claims rather than by the foregoing description, and all changes which come within the meaning and range of equivalency of the claims are therefore intended to be embraced therein.

The invention claimed is:

1. A system comprising an access right management device, which is provided in each domain, for creating a resource-sharing policy for sharing computer equipment resources, and performing resource-sharing policy negotiation between a plurality of domain administrators, wherein
the access right management device comprises a computer and performs:
for each policy unit to be negotiated of the resource-sharing policy, separately identifying an access right management device which is a negotiating partner about each policy unit to be negotiated; generating negotiation information including an identification name of the identified access right management device and the policy unit to be negotiated; and transmitting the negotiation information to the identified access right management device, wherein each policy unit comprises an access subject, an access object, and an access action; and
setting the resource-sharing policy on shared resource when having received an instruction to agree on every policy unit from the identified access right management device to which the negotiation information was sent,
wherein, when a first domain administrator has agreed on a policy unit with a second domain administrator, the first domain administrator affixes its own digital signature to the policy unit,
wherein the instruction to agree on the policy unit is verified by digital signatures of both the first domain administrator and the second domain administrator affixed to the policy unit.

2. The system according to claim 1, wherein the access right management device comprises:
a policy editing section for creating and editing the resource-sharing policy;
a group management section for storing domain information including identification names of users, domain administrators and the access right management device involved in resource sharing and relations with domains;
a shared resource management section for storing an identification name of shared resource and the domain which are associated with each other;
a negotiation information generation section for extracting from the resource-sharing policy the policy unit to be negotiated with the domain which is a negotiating partner and generating the negotiation information by referring to the group management section and the shared resource management section;
a policy negotiating section for performing negotiation to obtain an agreement with the identified access right management device on the policy unit of the resource-sharing policy and, when having agreed on the policy unit with the negotiating partner, affixing a digital signature of the domain administrator to the policy unit; and
a policy enforcement section for setting only an agreed resource-sharing policy on shared resource when digital signatures of both the domain administrators negotiated are affixed to the policy unit to determine that the policy unit has been agreed on.

3. The system according to claim 2, wherein when the policy editing section creates a new resource-sharing policy or alters a resource-sharing policy, the negotiation information generation section divides the resource-sharing policy into policy units and, for each policy unit, inquires of the group management section which domain the identification name of a user belongs to, or inquires of the shared resource management section which domain the identification name of a shared resource belongs to, thereby identifying a negotiating partner about the policy unit, and generates negotiation information including a list of identification names of involved access right management devices and at least one policy unit to be negotiated.

4. The system according to claim 2, wherein the policy negotiation section sends the negotiation information generated by the negotiation information generation section to the access right management device included in the negotiation information and when an instruction to agree on the policy unit included in the negotiation information is obtained from the access right management device to which the negotiation information has been sent, a digital signature of a domain administrator of that access right management device is affixed to the policy unit.

5. The system according to claim 4, wherein the policy negotiation section checks for presence of a digital signature and, when determining that the policy unit has been agreed on, updates the resource-sharing policy in question with the agreed policy unit.

6. The system according to claim 1, wherein the shared resource is a virtual shared resource, wherein the system further comprises a virtual resource generation section of a computer for generating the virtual shared resource and registering information of generated virtual shared resource in the access right management device.

7. A system comprising:
an access right management server provided in each domain, which, for each policy unit to be negotiated of a generated resource-sharing policy for sharing computer equipment resources, separately identifies a negotiating partner about the policy unit; generates negotiation information including an identification name of the identified negotiating partner and the policy unit to be negotiated; and transmits the negotiation information to the identified negotiating partner; and when having received an instruction to agree on every policy unit from the identified negotiating partner to which the negotiation information was sent, sets the resource-sharing policy on shared resource, wherein each policy unit comprises an access subject, an access object, and an access; and
a client terminal which connects to the access right management server to allow a domain administrator to instruct editing, negotiation and forcedly setting of the resource-sharing policy,
wherein, when the access right management server has agreed on a policy unit with the identified negotiating partner, the access right management server affixes its own digital signature to the policy unit, wherein the instruction to agree on the policy unit is verified by digital signatures of both the access right management server and the identified negotiating partner affixed to the policy unit.

8. The system according to claim 1, further comprising a conflict verification section of a computer for detecting a conflict between the resource-sharing policy and a predetermined restrictive condition.

9. The system according to claim 7, further comprising a conflict verification section for detecting a conflict between the resource-sharing policy and a predetermined restrictive condition.

10. A server, which is provided in each domain, for creating a resource-sharing policy for sharing computer equipment resources, and performing resource-sharing policy negotiation between a plurality of domain administrators, wherein the server performs:

for each policy unit to be negotiated of the resource-sharing policy, separately identifying a server which is a negotiating partner about each policy unit to be negotiated; generating negotiation information including an identification name of the identified server and the policy unit to be negotiated; and transmitting the negotiation information to the identified server, wherein each policy unit comprises an access subject, an access object, and an access action; and setting the resource-sharing policy on shared resource when having received an instruction to agree on every policy unit from the identified server to which the negotiation information was sent, wherein, when the server has agreed on a policy unit with the identified server, the server affixes its own digital signature to the policy unit, wherein the instruction to agree on the policy unit is verified by digital signatures of both the server and the identified server affixed to the policy unit.

11. The server according to claim 10, comprising:

a policy editing section for creating and editing the resource-sharing policy;

a group management section for storing domain information including identification names of users, domain administrators and the server involved in resource sharing and relations with domains;

a shared resource management section for storing an identification name of shared resource and the domain which are associated with each other;

a negotiation information generation section for extracting from the resource-sharing policy the policy unit to be negotiated with the domain which is a negotiating partner and generating the negotiation information by referring to the group management section and the shared resource management section;

a policy negotiating section for performing negotiation to obtain an agreement with the identified server on the policy unit of the resource-sharing policy and, when having agreed on the policy unit with the identified server, affixing a digital signature of the server to the policy unit; and a policy enforcement section for setting only an agreed resource-sharing policy on shared resource when digital signatures of both the server and the identified server negotiated are affixed to the policy unit to determine that the policy unit has been agreed on.

12. The server according to claim 11, wherein when the policy editing section creates a new resource-sharing policy or alters a resource-sharing policy, the negotiation information generation section divides the resource-sharing policy into policy units and, for each policy unit, inquires of the group management section which domain the identification name of a user belongs to, or inquires of the shared resource management section which domain the identification name of a shared resource belongs to, thereby identifying a negotiating partner about the policy unit, and generates negotiation information including a list of identification names of involved servers and at least one policy unit to be negotiated.

13. The server according to claim 11, wherein the policy negotiation section sends the negotiation information generated by the negotiation information generation section to the server included in the negotiation information and when an instruction to agree on the policy unit included in the negotiation information is obtained from the server to which the negotiation information has been sent, a digital signature of a domain administrator of that server is affixed to the policy unit.

14. The server according to claim 13, wherein the policy negotiation section checks for presence of a digital signature and, when determining that the policy unit has been agreed on, updates the resource-sharing policy in question with the agreed policy unit.

15. The server according to claim 10, wherein the shared resource is a virtual shared resource, wherein the system further comprises a virtual resource generation section for generating the virtual shared resource and registering information of generated virtual shared resource in the server.

16. A non-transitory computer-readable medium storing an access right management program which runs on an access right management server provided in each domain, for creating a resource-sharing policy for sharing computer equipment resources, and performing resource-sharing policy negotiation between a plurality of domain administrators, wherein the program instructs the access right management server to perform:

a function of, for each policy unit to be negotiate d of the resource-sharing policy, separately identifying an access right management server which is a negotiating partner about each policy unit to be negotiated; generating negotiation information including an identification name of the identified access right management server and the policy unit to be negotiated; and transmitting the negotiation information to the identified access right management server, wherein each policy unit comprises an access subject, an access object, and an access action; and a function of setting the resource-sharing policy on shared resource when having received an instruction to agree on every policy unit from the identified access right management server to which the negotiation information was sent, wherein, when the access right management server has agreed on a policy unit with the identified access right management, the access right management server affixes its own digital signature to the policy unit, wherein the instruction to agree on the policy unit is verified by digital signatures of both the access right management server and the identified access right management server affixed to the policy unit.

17. The non-transitory computer-readable medium according to claim 16, wherein the program instructs the access right management server to perform:

a policy editing function of creating and editing the resource-sharing policy;

a group management function of storing domain information including identification names of users, domain administrators and the server involved in resource sharing and relations with domains;

a shared resource management function of storing an identification name of shared resource and the domain which are associated with each other;

a negotiation information generation function of extracting from the resource-sharing policy the policy unit to be negotiated with the domain which is a negotiating partner and generating the negotiation information by referring to the group management function and the shared resource management function;

a policy negotiating function of performing negotiation to obtain an agreement with the identified access right management server on the policy unit of the resource-sharing policy and, when having agreed on the policy unit with the identified access right management server, affixing a digital signature of the server to the policy unit; and a policy enforcement function of setting only an agreed resource-sharing policy on shared resource when digital signatures of both the access right management server and the identified access right management server negotiated are affixed to the policy unit to determine that the policy unit has been agreed on.

18. The non-transitory computer-readable medium according to claim 16, wherein when the policy editing function creates a new resource-sharing policy or alters a resource-sharing policy, the negotiation information generation function divides the resource sharing policy into policy units and, for each policy unit, inquires of the group management function which domain the identification name of a user belongs to, or inquires of the shared resource management function which domain the identification name of a shared resource belongs to, thereby identifying a negotiating partner about the policy unit, and generates negotiation information including a list of identification names of involved access right management servers and at least one policy unit to be negotiated.

19. The non-transitory computer-readable medium according to claim 18, wherein the policy negotiation function sends the negotiation information generated by the negotiation information generation function to the access right management server included in the negotiation information and when an instruction to agree on the policy unit included in the negotiation information is obtained from the access right management server to which the negotiation information has been sent, a digital signature of a domain administrator of that access right management server is affixed to the policy unit.

20. The non-transitory computer-readable medium according to claim 19, wherein the policy negotiation function checks for presence of a digital signature and, when determining that the policy unit has been agreed on, updates the resource-sharing policy in question with the agreed policy unit.

21. The non-transitory computer-readable medium according to claim 16, wherein the shared resource is a virtual shared resource, wherein the program further comprises a virtual resource generation function of generating the virtual shared resource and registering information of generated virtual shared resource in the access right management server.

22. A method for creating a resource-sharing policy for sharing computer equipment resources, and performing resource-sharing policy negotiation between a plurality of domain administrators in an access right management server provided in each domain, comprising:

for each policy unit to be negotiated of the resource-sharing policy, separately identifying an access right management server which is a negotiating partner about each policy unit to be negotiated; generating negotiation information including an identification name of the identified access right management server and the policy unit to be negotiated; and transmitting the negotiation information to the identified access right management server, wherein each policy unit comprises an access subject, an access object, and an access action; and setting the resource-sharing policy on shared resource when having received an instruction to agree on every policy unit from the identified access right management server to which the negotiation information was sent, wherein, when the access right management server has agreed on a policy unit with the identified access right management server, the access right management server affixes its own digital signature to the policy unit, wherein the instruction to agree on the policy unit is verified by digital signatures of both the access right management server and the identified access right management server affixed to the policy unit.

23. The method according to claim 22, comprising:

creating and editing the resource-sharing policy;

storing domain information including identification names of users, domain administrators and the server involved in resource sharing and relations with domains;

storing an identification name of shared resource and the domain which are associated with each other;

extracting from the resource-sharing policy the policy unit to be negotiated with the domain which is a negotiating partner and generating the negotiation information by referring to the domain information, the identification name of the shared resource and the domain;

performing negotiation to obtain an agreement with the identified access right management server on the policy unit of the resource-sharing policy and, when having agreed on the policy unit with the identified access right management server, affixing a digital signature of the server to the policy unit; and setting only an agreed resource-sharing policy on shared resource when digital signatures of both the access right management serve and the identified access right management server negotiated are affixed to the policy unit to determine that the policy unit has been agreed on.

24. The method according to claim 22, wherein when creating a new resource-sharing policy or altering a resource-sharing policy, dividing the resource-sharing policy into policy units and, for each policy unit, inquiring about which domain the identification name of a user belongs to, or inquiring about which domain the identification name of a shared resource belongs to, thereby identifying a negotiating partner about the policy unit, and generating negotiation information including a list of identification names of involved access right management servers and at least one policy unit to be negotiated.

25. The method according to claim 22, wherein the shared resource is a virtual shared resource, wherein the method further comprises generating the virtual shared resource and registering information of generated virtual shared resource in the access right management server.

* * * * *

UNITED STATES PATENT AND TRADEMARK OFFICE
CERTIFICATE OF CORRECTION

| | |
|---|---|
| PATENT NO. | : 8,296,821 B2 |
| APPLICATION NO. | : 12/068673 |
| DATED | : October 23, 2012 |
| INVENTOR(S) | : Nakae |

Page 1 of 1

It is certified that error appears in the above-identified patent and that said Letters Patent is hereby corrected as shown below:

On the Title Page:

The first or sole Notice should read --

Subject to any disclaimer, the term of this patent is extended or adjusted under 35 U.S.C. 154(b) by 1123 days.

Signed and Sealed this
Eleventh Day of November, 2014

Michelle K. Lee
*Deputy Director of the United States Patent and Trademark Office*